United States Patent
Wang et al.

(10) Patent No.: US 9,807,401 B2
(45) Date of Patent: Oct. 31, 2017

(54) TRANSFORM UNIT PARTITIONING FOR CHROMA COMPONENTS IN VIDEO CODING

(71) Applicant: QUALCOMM Incorporated, San Diego, CA (US)

(72) Inventors: Xianglin Wang, San Diego, CA (US); Liwei Guo, San Diego, CA (US); Yunfei Zheng, Cupertino, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 13/665,559

(22) Filed: Oct. 31, 2012

(65) Prior Publication Data

US 2013/0107970 A1     May 2, 2013

Related U.S. Application Data

(60) Provisional application No. 61/554,273, filed on Nov. 1, 2011.

(51) Int. Cl.
*H04N 7/12*           (2006.01)
*H04N 19/186*      (2014.01)
(Continued)

(52) U.S. Cl.
CPC ......... *H04N 19/186* (2014.11); *H04N 19/122* (2014.11); *H04N 19/176* (2014.11); *H04N 19/61* (2014.11); *H04N 19/96* (2014.11)

(58) Field of Classification Search
None
See application file for complete search history.

(56) References Cited

U.S. PATENT DOCUMENTS 6,553,153 B1 * 4/2003 Cui .................. G06T 3/4007
                                                     348/387.1
7,317,839 B2     1/2008   Holcomb
(Continued)

FOREIGN PATENT DOCUMENTS

WO     2011040302 A1     4/2011
WO     2011068527 A1     6/2011
(Continued)

OTHER PUBLICATIONS

Wiegand et al., "WD1: Working Draft 1 of High-Efficiency Video Coding", JCTVC-C403, 3rd Meeting: Guangzhou, Oct. 7-15, 2010, 137 pp.

(Continued)

*Primary Examiner* — Andy Rao
*Assistant Examiner* — Samuel D Fereja

(57) ABSTRACT

A video encoding device is configured to obtain an N by N array of residual values for a luma component and a corresponding N/2 by N array of residual values for a chroma component. The video encoding device may partition the N/2 by N array of residual values for the chroma component into two N/2 by N/2 sub-arrays of chroma residual values. The video encoding device may further partition the sub-arrays of chroma residual values based on the partitioning of the array of residual values for the luma component. Video encoding device may perform a transform on each of the sub-arrays of chroma residual values to generate transform coefficients. A video decoding device may use data defining sub-arrays of transform coefficients to perform a reciprocal process to generate residual values.

31 Claims, 16 Drawing Sheets

Non-split block case

Square TU partition

(51) Int. Cl.
*H04N 19/176* (2014.01)
*H04N 19/122* (2014.01)
*H04N 19/61* (2014.01)
*H04N 19/96* (2014.01)

(56) References Cited

U.S. PATENT DOCUMENTS

| | | | |
|---|---|---|---|
| 8,139,636 B2 | 3/2012 | Sato et al. | |
| 8,139,875 B2 * | 3/2012 | Sekiguchi et al. | 382/233 |
| 2002/0071491 A1 * | 6/2002 | Sugiyama | H04N 19/00 375/240.23 |
| 2006/0039463 A1 * | 2/2006 | Kadono | 375/240.01 |
| 2007/0098064 A1 | 5/2007 | Au et al. | |
| 2007/0110153 A1 * | 5/2007 | Cho | H04N 19/176 375/240.12 |
| 2008/0170615 A1 * | 7/2008 | Sekiguchi | H04N 19/70 375/240.14 |
| 2010/0027624 A1 * | 2/2010 | Yu | 375/240.12 |
| 2011/0013700 A1 | 1/2011 | Kim | |
| 2011/0255608 A1 * | 10/2011 | Kim | H04N 19/00781 375/240.25 |
| 2011/0274158 A1 * | 11/2011 | Fu et al. | 375/240.02 |
| 2012/0189056 A1 * | 7/2012 | Li et al. | 375/240.15 |
| 2012/0219216 A1 | 8/2012 | Sato | |
| 2012/0230394 A1 * | 9/2012 | Lu | H04N 19/176 375/240.02 |
| 2013/0034153 A1 * | 2/2013 | Song et al. | 375/240.03 |
| 2013/0039423 A1 * | 2/2013 | Helle et al. | 375/240.13 |
| 2013/0051452 A1 * | 2/2013 | Li et al. | 375/240.01 |

FOREIGN PATENT DOCUMENTS

| | | | |
|---|---|---|---|
| WO | WO 2011129673 A2 * | 10/2011 | 375/240 |
| WO | 2012122355 A1 | 9/2012 | |

OTHER PUBLICATIONS

Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Guo et al., "Limiting Chroma Transform Depth in Residue Quad Tree (RQT)," JCTVC-E377, 5th Meeting: Geneva, CH, Mar. 16-23, 2011, 3 pp.
Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Invitation to Pay Additional Fees—PCT/US2012/063055—ISA/EPO—Jan. 21, 2013, 9 pp.
Tan et al., "On residual quad-tree coding in HEVC" 2011 IEEE 13th International Workshop on Multimedia Signal Processing (MMSP), IEEE, Oct. 17, 2011, 4 pp.
Wiegand et al., "BoG report: residual quadtree structure," JCTVC-C319, 3rd Meeting: Guangzhou, CH, Oct. 7-15, 2010, 17 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
Zhou et al., "Evaluation results on Residual Quad Tree (RQT)," JCTVC-D060, 4th Meeting: Daegu, KR, Jan. 20-28, 2011, 7 pp.
International Preliminary Report on Patentability from International Application No. PCT/US2012/063055, dated Jun. 16, 2014, 12 pp.
Communication pursuant to Rules 161(1) and 162 EPC from counterpart European Application No. 12787291.9-1908, dated Jul. 8, 2014, 2 pp.
Wang et al., "CE5: LCEC coded block flag coding under residual quadtree," Joint Collaborative Team on Video Coding (JCT-VC) of ITU-T SG16 WP3 and ISO/IEC JTC1/SC291WG11, 5th Meeting: Geneva, CH, JCTVC, Mar. 16-23, 2011, JCTVC-E404, URL, http://phenix.it-sudparis.eu/jct/index.php, 10 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Cao X. et al., "CE6.b Report on test1 Harmonization of SDIP and RQT," JCTVC-F533, Joint Collaborative Team on Video Coding (JCT-VC) of ISO/IEC JTC1/SC29/WG11 and ITU-T SG.16, JCT-VC Meeting; MPEG Meeting: Jul. 14-22, 2011: Torino, IT, 4 pp; URL: http://wftp3.itu.int/av-arch/jctvc-site/.
Chen et al: "CE5: LCEC coded block flag coding under residual quadtree," JCTVC-E404, Joint Collaborative Team on Video Coding (JCT-VC) of ITU-T SG16 WP3 and ISO/IEC JTC1/SC29/WG11, 5th Meeting: Mar. 16-23, 2011: Geneva, CH, 10 pp.
International Search Report and Written Opinion—PCT/US2012/063055—ISA/EPO—Mar. 7, 2013, 22 pp.
Larbier, "Using 10-bit AVC/H.264 Encoding with 4:2:2 for Broadcast Contribution," ATEM, NAB 2009, 7 pages.
Panusopone et al., "Proposal on RQT root location", MPEG Meeting; Mar. 16-23, 2011; Geneva; (Motion Picture Expert Group or ISO/IEC JTC1/SC29/WG11) No. m19893, XP030048460, section 3.1 Luma optimization, section 3.2 Chroma optimization, 10 pp.
Panusopone et al., "RQT with rectangular transform unit support," JCT-VC Meeting; MPEG Meeting; Jul. 14-22, 2011; Torino; (Joint Collaborative Team on Video Coding of ISO/IEC JTC1/SC29/WG11 and ITU-T SG.16 ); URL: http://wftp3.itu.int/av-arch/jctvc-site/ No. JCTVC-F578, XP030009601, section 2 Rectangular TU coding, section 3 Simplified residual tree, 3 pp.
Wang et al., "LCEC coded block flag coding under residual quadtree," JCTVC-D375, Joint Collaborative Team on Video Coding (JCT-VC) of ITU-T SG16 WP3 and ISO/IEC JTC1/SC29/WG11; (Motion Picture Expert Group or ISO/IEC JTC1/SC29/WG11): 4th Meeting: Daegu, KR, Jan. 20-28, 2011, No. m19152, XP030047719, 2 pp.
Response to Written Opinion dated Mar. 7, 2013 from International Application No. PCT/US2012/063024, dated Aug. 23, 2013, 38 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

\* cited by examiner

4:2:0 sample format

4:2:2 sample format

4:4:4 sample format

16x16 CU with 4:2:2 Sample Format

○ Luma Sample
⊗ Chroma Samples

**Quad-tree decomposition
of CU into TUs**

Quad-tree decomposition into non-square blocks

Quad-tree decomposition into non-square blocks

Level diagram of quad-tree decomposition

16x16 CU with 4:2:2 sample format with TU partitioning

○ Luma Sample
⊗ Chroma Samples

Non-split block case

Square TU partition

Horizontally oriented non-square TU partition

Vertically oriented non-square TU partition

16x16 CU with 4:2:2 sample format

Non-split block case

Square TU partition

Horizontally oriented non-square TU partition

Vertically oriented non-square TU partition

TRANSFORM UNIT PARTITIONING FOR CHROMA COMPONENTS IN VIDEO CODING

RELATED APPLICATIONS

This application claims the benefit of:
U.S. Provisional Application No. 61/554,273, filed Nov. 1, 2011, which is hereby incorporated by reference in its entirety.

TECHNICAL FIELD

This disclosure relates to video coding and, more particularly, to transform unit partitioning.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may be encoded using spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to the transform coefficients to achieve further compression.

SUMMARY

In general, in one aspect, this disclosure describes techniques for synchronizing transform unit (TU) partitioning between luma and chroma components when a 4:2:2 sampling format is applied. As an example, when video data is formatted according to a 4:2:2 sampling format, the techniques may include partitioning a block of each chroma component into a first chroma sub-block and a second chroma sub-block for transform purposes. The first and second chroma sub-blocks may be, for example, a top chroma sub-block and a bottom chroma sub-block, respectively. Transform unit partitioning of the luma component may be synchronized with further partitions in both of the two chroma sub-blocks. In this manner, with a 4:2:2 sampling format, a transform unit of a chroma component that is partitioned according to these techniques may result in more useful or desirable sizes and shapes of transforms. In some cases, the techniques described herein may be applied such that chroma transform units have the same aspect ratio as corresponding transform units of the luma component.

In general, another aspect of this disclosure describes techniques for coded block flag (CBF) coding when partitioning transform units. As an example, in coding the coded block flag for a transform unit of a chroma component (U or V), for each chroma component corresponding to the 4:2:2 format, a joint coded block flag may be first signaled for each pair of first and second (e.g., top and bottom) chroma transform units of a chroma component. If the joint coded block flag indicates that there is at least one non-zero coefficient in the pair of chroma transform units, i.e., within at least one of the chroma transform units in the pair, one or more additional coded block flags may be sent to signal if each of the two transform units has any non-zero transform coefficients. Otherwise, if the joint coded block flag indicates that there is not at least one non-zero coefficient in the pair of chroma transform units, no further signaling of coded block flags is needed for transform units for the pair of chroma components.

In one example, the disclosure describes a method for decoding video data comprising obtaining an N by N array of transform coefficients for a luma component of video data, obtaining a plurality of corresponding N/2 by N/2 sub-arrays of transform coefficients for a chroma component of video data, performing an inverse transform on each of the N/2 by N/2 sub-arrays of chroma transform coefficients to generate a plurality of N/2 by N/2 sub-arrays of residual sample values, and combining each of the N/2 by N/2 sub-arrays of residual sample values to form an N/2 by N array of residual sample values for the chroma component.

In one example, the disclosure describes a method for decoding video data comprising obtaining a plurality of N/2 by N/2 sub-arrays of transform coefficients for a luma component of video data, obtaining a plurality of corresponding N/4 by N/4 sub-arrays of transform coefficients for a chroma component of video data, performing an inverse transform on each of the plurality of N/4 by N/4 sub-arrays of chroma transform coefficients to generate a plurality of N/4 by N/4 sub-arrays of residual sample values, and combining each of the N/4 by N/4 sub-arrays of residual sample values to form an N/2 by N array of residual sample values for the chroma component.

In one example, the disclosure describes a method for decoding video data comprising obtaining four N by N/4 sub-arrays of transform coefficients for a luma component of video data, obtaining eight corresponding N/2 by N/8 sub-arrays of transform coefficients for a chroma component of video data, performing an inverse transform on each of the N/2 by N/8 sub-arrays of chroma transform coefficients to generate eight N/2 by N/8 sub-arrays of residual sample values, and combining each of the N/2 by N/8 sub-arrays of residual sample values to form an N/2 by N array of residual sample values for the chroma component.

In another example, the disclosure describes a video decoding device comprising one or more processors configured to obtain an N by N array of transform coefficients for a luma component of video data, obtain a plurality of corresponding N/2 by N/2 sub-arrays of transform coefficients for a chroma component of video data, perform an inverse transform on each of the N/2 by N/2 sub-arrays of chroma transform coefficients to generate a plurality of N/2 by N/2 sub-arrays of residual sample values, and combine each of the N/2 by N/2 sub-arrays of residual sample values to form an N/2 by N array of residual sample values for the chroma component.

In another example, the disclosure describes a video decoding device comprising one or more processors configured to obtain a plurality of N/2 by N/2 sub-arrays of transform coefficients for a luma component of video data, obtain a plurality of corresponding N/4 by N/4 sub-arrays of transform coefficients for a chroma component of video data, perform an inverse transform on each of the plurality of N/4 by N/4 sub-arrays of chroma transform coefficients to generate a plurality of N/4 by N/4 sub-arrays of residual sample values, and combine each of the N/4 by N/4 sub-arrays of residual sample values to form an N/2 by N array of residual sample values for the chroma component.

In another example, the disclosure describes a video decoding device comprising one or more processors configured to obtain four N by N/4 sub-arrays of transform coefficients for a luma component of video data, obtain eight corresponding N/2 by N/8 sub-arrays of transform coefficients for a chroma component of video data, perform an inverse transform on each of the N/2 by N/8 sub-arrays of chroma transform coefficients to generate eight N/2 by N/8 sub-arrays of residual sample values, and combine each of the N/2 by N/8 sub-arrays of residual sample values to form an N/2 by N array of residual sample values for the chroma component.

In another example, the disclosure describes a non-transitory computer-readable medium comprising instructions stored thereon that when executed cause one or more processors to obtain an N by N array of transform coefficients for a luma component of video data, obtain a plurality of corresponding N/2 by N/2 sub-arrays of transform coefficients for a chroma component of video data, perform an inverse transform on each of the N/2 by N/2 sub-arrays of chroma transform coefficients to generate a plurality of N/2 by N/2 sub-arrays of residual sample values, and combine each of the N/2 by N/2 sub-arrays of residual sample values to form an N/2 by N array of residual sample values for the chroma component.

In another example, the disclosure describes a non-transitory computer-readable medium comprising instructions stored thereon that when executed cause one or more processors to obtain a plurality of N/2 by N/2 sub-arrays of transform coefficients for a luma component of video data, obtain a plurality of corresponding N/4 by N/4 sub-arrays of transform coefficients for a chroma component of video data, perform an inverse transform on each of the plurality of N/4 by N/4 sub-arrays of chroma transform coefficients to generate a plurality of N/4 by N/4 sub-arrays of residual sample values, and combine each of the N/4 by N/4 sub-arrays of residual sample values to form an N/2 by N array of residual sample values for the chroma component.

In another example, the disclosure describes a non-transitory computer-readable medium comprising instructions stored thereon that when executed cause one or more processors to obtain four N by N/4 sub-arrays of transform coefficients for a luma component of video data, obtain eight corresponding N/2 by N/8 sub-arrays of transform coefficients for a chroma component of video data, perform an inverse transform on each of the N/2 by N/8 sub-arrays of chroma transform coefficients to generate eight N/2 by N/8 sub-arrays of residual sample values, and combine each of the N/2 by N/8 sub-arrays of residual sample values to form an N/2 by N array of residual sample values for the chroma component.

In another example, the disclosure describes an apparatus for decoding video data comprising means for obtaining an N by N array of transform coefficients for a luma component of video data, means for obtaining a plurality of corresponding N/2 by N/2 sub-arrays of transform coefficients for a chroma component of video data, means for performing an inverse transform on each of the N/2 by N/2 sub-arrays of chroma transform coefficients to generate a plurality of N/2 by N/2 sub-arrays of residual sample values, and means for combining each of the N/2 by N/2 sub-arrays of residual sample values to form an N/2 by N array of residual sample values for the chroma component.

In another example, the disclosure describes an apparatus for decoding video data comprising means for obtaining a plurality of N/2 by N/2 sub-arrays of transform coefficients for a luma component of video data, means for obtaining a plurality of corresponding N/4 by N/4 sub-arrays of transform coefficients for a chroma component of video data, means for performing an inverse transform on each of the plurality of N/4 by N/4 sub-arrays of chroma transform coefficients to generate a plurality of N/4 by N/4 sub-arrays of residual sample values, and means for combining each of the N/4 by N/4 sub-arrays of residual sample values to form an N/2 by N array of residual sample values for the chroma component.

In another example, the disclosure describes an apparatus for decoding video data comprising means for obtaining four N by N/4 sub-arrays of transform coefficients for a luma component of video data, means for obtaining eight corresponding N/2 by N/8 sub-arrays of transform coefficients for a chroma component of video data, means for performing an inverse transform on each of the N/2 by N/8 sub-arrays of chroma transform coefficients to generate eight N/2 by N/8 sub-arrays of residual sample values, and means for combining each of the N/2 by N/8 sub-arrays of residual sample values to form an N/2 by N array of residual sample values for the chroma component.

In one example, the disclosure describes a method for encoding video data comprising obtaining an N by N array of residual values for a luma component of video data, obtaining a corresponding N/2 by N array of residual values for a chroma component of video data, partitioning the N/2 by N array of residual values for the chroma component into two N/2 by N/2 sub-arrays of chroma residual values, and generating transform coefficients for the chroma component by performing a transform on each of the sub-arrays of chroma residual values.

In another example, the disclosure describes an apparatus for encoding video data comprising means for obtaining an N by N array of residual values for a luma component of video data, means for obtaining a corresponding N/2 by N array of residual values for a chroma component of video data, means for partitioning the N/2 by N array of residual values for the chroma component into two N/2 by N/2 sub-arrays of chroma residual values, and means for generating transform coefficients for the chroma component by performing a transform on each of the sub-arrays of chroma residual values.

In another example, the disclosure describes a video encoding device comprising one or more processors configured to obtain an N by N array of residual values for a luma component of video data, obtain a corresponding N/2 by N array of residual values for a chroma component of video data, partition the N/2 by N array of residual values for the chroma component into two N/2 by N/2 sub-arrays of chroma residual values, and generate transform coefficients for the chroma component by performing a transform on each of the sub-arrays of chroma residual values.

In another example, the disclosure describes a non-transitory computer-readable medium comprising instructions stored thereon that when executed cause one or more processors to obtain an N by N array of residual values for a luma component of video data, obtain a corresponding N/2 by N array of residual values for a chroma component of video data, partition the N/2 by N array of residual values for the chroma component into two N/2 by N/2 sub-arrays of chroma residual values, and generate transform coefficients for the chroma component by performing a transform on each of the sub-arrays of chroma residual values.

In one example, the disclosure describes a method for encoding video data determining whether a first transform unit associated with a chroma component includes at least one nonzero transform coefficients, determining whether a second transform unit associated with the chroma component includes at least one nonzero transform coefficients and generating a joint coded block flag for the first transform unit and the second transform unit, wherein the joint coded block flag indicates whether either of the first transform unit or the second transform unit includes at least one nonzero transform coefficients.

In another example, the disclosure describes an apparatus for encoding video data comprising means for determining whether a first transform unit associated with a chroma component includes at least one nonzero transform coefficients, means for determining whether a second transform unit associated with the chroma component includes at least one nonzero transform coefficients and generating a joint coded block flag for the first transform unit and the second transform unit, wherein the joint coded block flag indicates whether either of the first transform unit or the second transform unit includes at least one nonzero transform coefficients.

In another example, the disclosure describes a video encoding device comprising one or more processors configured to determine whether a first transform unit associated with a chroma component includes at least one nonzero transform coefficients, determine whether a second transform unit associated with the chroma component includes at least one nonzero transform coefficients and generating a joint coded block flag for the first transform unit and the second transform unit, wherein the joint coded block flag indicates whether either of the first transform unit or the second transform unit includes at least one nonzero transform coefficients.

In another example, the disclosure describes a non-transitory computer-readable medium comprising instructions stored thereon that when executed cause one or more processors to determine whether a first transform unit associated with a chroma component includes at least one nonzero transform coefficients, determine whether a second transform unit associated with the chroma component includes at least one nonzero transform coefficients and generating a joint coded block flag for the first transform unit and the second transform unit, wherein the joint coded block flag indicates whether either of the first transform unit or the second transform unit includes at least one nonzero transform coefficients.

The details of one or more examples are set forth in the accompanying drawings and the description below. Other features, objects, and advantages will be apparent from the description and drawings, and from the claims.

DETAILED DESCRIPTION

Figure 1A:
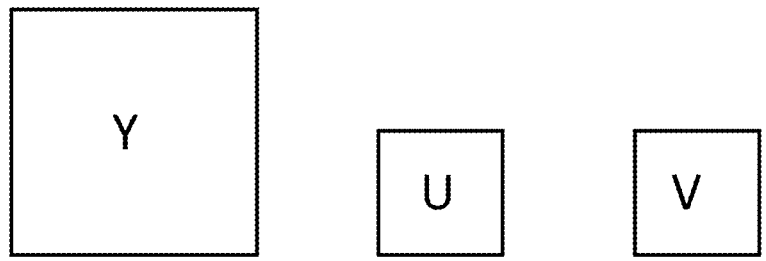
FIGS. 1A-1C are conceptual diagrams illustrating different sample formats for luma and chroma components of a coding unit.

According to some video coding standards a coding unit (CU), its luma component and its chroma components, may share the same quadtree decomposition structure for transform unit (TU) partitioning. Under different color sampling formats, the corresponding chroma component blocks may have different sizes and shapes than the luma block. Further, according to a current version of HEVC, not all different sizes and shapes of transforms that may result from the TU partitioning are defined and available to use for the chroma component blocks. Thus, other techniques for transform unit partitioning of chroma components may result in more useful shapes and sizes of TUs. According to some of the example techniques described herein, under the 4:2:2 format, a transform unit for chroma component partitions may have the same aspect ratio as its corresponding transform unit for the luma component.

Digital video devices implement video compression techniques to encode and decode digital video information more efficiently. Video compression techniques may be defined according to a video coding standard. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG).

HEVC standardization efforts are based on a model of a video coding device referred to as the HEVC Test Model (HM). The HM presumes improvements in the capabilities of current video coding devices with respect to video coding devices available during the development of other previous video coding standards, e.g., ITU-T H.264/AVC. For example, whereas H.264 provides nine intra-prediction encoding modes, HEVC provides as many as thirty-five intra-prediction encoding modes. A recent working Draft (WD) of HEVC, referred to as "HEVC Working Draft 4" or "WD4," is described in document JCTVC-F803 d2, Bross et al., "WD4: Working Draft 4 of High-Efficiency Video Coding (HEVC)," Joint Collaborative Team on Video Coding (JCT-VC) of ITU-T SG16 WP3 and ISO/IEC JTC1/SC29/WG11, 6th Meeting: Torino, IT, July, 2011. Further, another recent working draft of HEVC, referred to as "HEVC Working Draft 8" or "WD8," is described in document HCTVC-J1003 d7, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, SE, Jul. 11-20, 2012. The HEVC standard may also be referred to as ISO/IEC 23008-HEVC, which is intended to be the standard number for the delivered version of HEVC. Coding according to some of the presently proposed aspects of the developing HEVC standard will be described in this application for purposes of illustration. However, the techniques described in this disclosure may also be useful for and applied to other video coding processes, such as those defined according to ITU-T H.264 or other standard or proprietary video coding processes.

A typical video encoder operating according to a video coding standard, such as HEVC WD4, partitions each frame (i.e., picture) of an original video sequence into contiguous rectangular regions called "blocks" or "coding units." These blocks may be encoded by applying spatial (intra-frame) prediction and/or temporal (inter-frame) prediction techniques to reduce or remove redundancy inherent in video sequences. A spatial prediction may be referred to as an "intra mode" (I-mode), and a temporal prediction may be referred to as an "inter mode" (P-mode or B-mode). Prediction techniques generate a predictive block of video data, which may also be referred to as a block of reference samples. A block of original video data to be coded is compared to the predictive block. The difference between the original block of video data and the predictive block may be referred to as residual data. Residual data is typically an array of the difference between pixel values of a predictive block and the original block of video data. A transform, e.g., a discrete cosine transform (DCT), an integer transform, a wavelet transform, or a conceptually similar transform may be applied to the residual data during the coding process to generate a corresponding set of transform coefficients. Thus, the original block of video can be reconstructed by performing an inverse transform on the transform coefficients and adding the residual data to the predictive block. Transform coefficients may also be quantized. That is, the values of the transform coefficients may be represented as a bit string according to a defined bit-depth. In some cases, quantization may result in the representation of low value transform coefficients as zero. Quantized transform coefficients may be referred to as transform coefficient levels.

For video coding according to HEVC, as one example, a video frame may be partitioned into coding units. A coding unit (CU) generally refers to a rectangular image region that serves as a basic unit to which various coding tools are applied for video compression. A CU is typically square, and may be considered to be similar to a so-called "macroblock" described in other video coding standards such as, for example, ITU-T H.264. A CU may be considered an array of video sample values. Video sample values may also be referred to as picture elements, pixels, or pels. The size of a CU may be defined according to a number of horizontal and vertical samples. Thus, a CU may be described as an N×N or N×M CU.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

To achieve better coding efficiency, a CU may have variable sizes depending on video content. A CU usually has a luminance component, denoted as Y, and two chroma components, denoted as U and V. The two chroma components U and V may also be denoted by $C_b$ and $C_r$, respectively. Further, according to HEVC, syntax data within a bitstream may define a largest coding unit (LCU), which is a largest CU for a frame or picture in terms of the number of samples. The size of a CU is usually defined according to the number of horizontal and vertical luma samples. Typically, an LCU includes 64×64 luma samples. CUs of other dimensions may be generated by recursively partitioning an LCU into sub-CUs. Syntax data for a bitstream may define a maximum number of times an LCU may be split, referred to as CU depth. Accordingly, a bitstream may also define a smallest coding unit (SCU). Typically, an SCU includes 8×8 luma samples. Thus, in one example, four 32×32 CUs may be generated by partitioning a 64×64 LCU into four sub-CUs and each of the 32×32 CUs may be further partitioned into sixteen 8×8 CUs.

A video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the H.264/AVC and HEVC WD4 video coding standards, a value called chroma_format_idc is defined to indicate different sampling formats of the chroma components, relative to the luma component. Table 1 illustrates the relationship between values of chroma_format_idc and associated chroma formats.

TABLE 1 different chroma formats defined in H.264/AVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component.

Figure 1B:
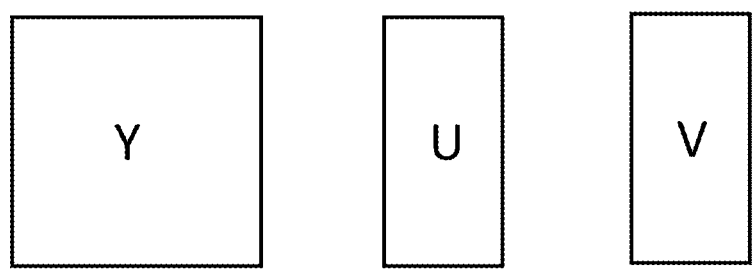
Figure 1C:
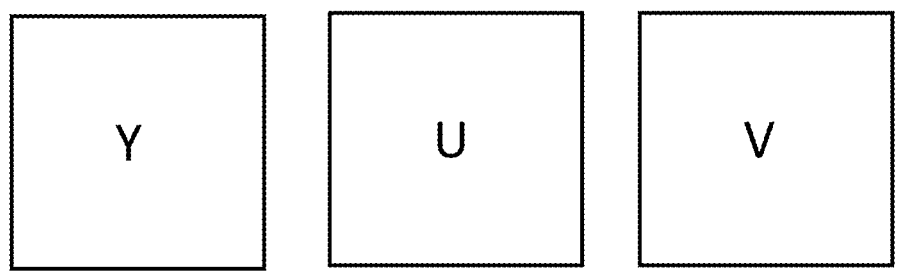

FIGS. 1A-1C are conceptual diagrams illustrating different sample formats for luma and chroma components of a coding unit. FIG. 1A is a conceptual diagram illustrating the 4:2:0 sample format. As illustrated in FIG. 1A, for the 4:2:0 sample format, the chroma components are one quarter of the size of the luma component. Thus, for a CU formatted according to the 4:2:0 sample format, there are four luma samples for every sample of a chroma component. FIG. 1B is a conceptual diagram illustrating the 4:2:2 sample format. As illustrated in FIG. 1B, for the 4:2:2 sample format, the chroma components are one half of the size of the luma component. Thus, for a CU formatted according to the 4:2:2 sample format, there are two luma samples for every sample of a chroma component. FIG. 1C is a conceptual diagram illustrating the 4:4:4 sample format. As illustrated in FIG. 1C, for the 4:4:4 sample format, the chroma components are the same size of the luma component. Thus, for a CU formatted according to the 4:4:4 sample format, there is one luma sample for every sample of a chroma component.

Figure 2:
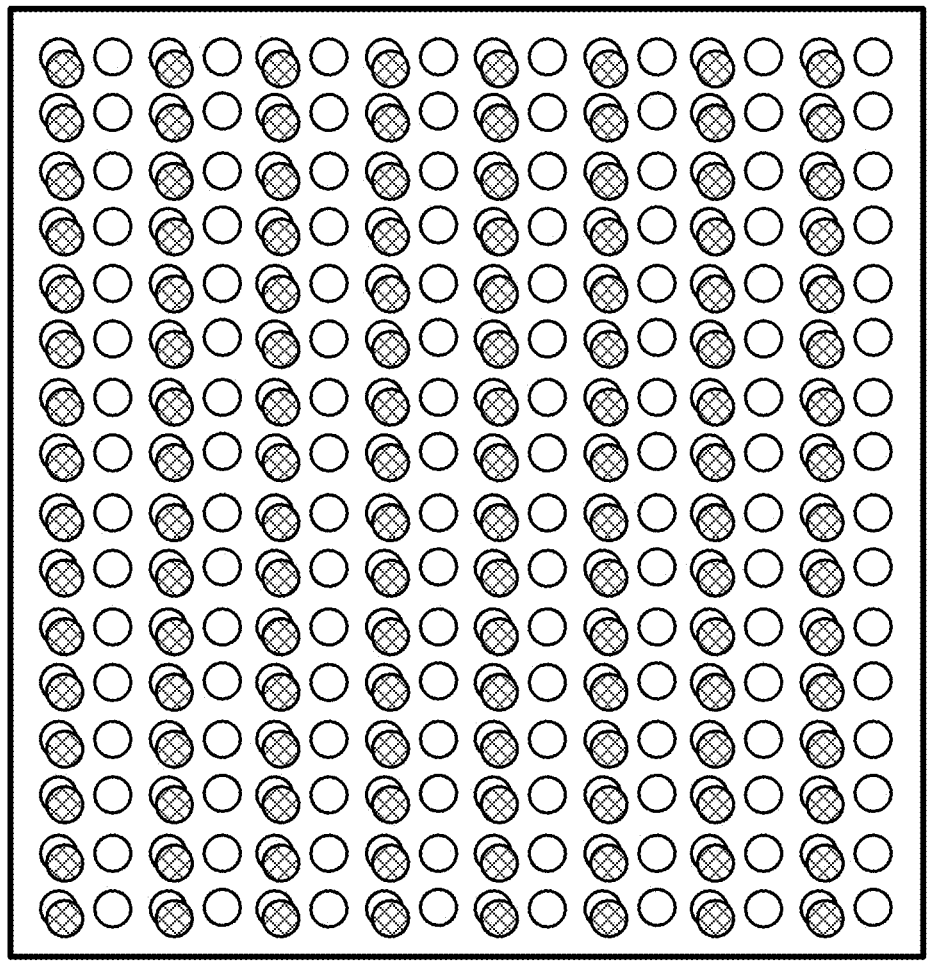
FIG. 2 is a conceptual diagram illustrating a 16×16 coding unit formatted according to a 4:2:2 sample format.

FIG. 2 is a conceptual diagram illustrating an example of a 16×16 coding unit formatted according to a 4:2:2 sample format. FIG. 2 illustrates the relative position of chroma samples with respect to luma samples within a CU. As described above, a CU is typically defined according to the number of horizontal and vertical luma samples. Thus, as illustrated in FIG. 2, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 2 may be partitioned into four 8×8 CUs, where each CU includes 8×8 samples for the luma component and 4×8 samples for each chroma component.

Further, in some video coding standards, a coding unit may be partitioned into smaller units for purposes of prediction or transform. According to the HEVC, a CU may include one or more prediction units (PUs) and/or one or more transform units (TUs). This disclosure also uses the term "block," "partition," or "portion" to refer to any of a CU, PU, or TU. In general, "portion" may refer to any sub-set of a video frame. Further, this disclosure typically uses the term "video block" to refer to a coding node of a CU. In some specific cases, this disclosure may also use the term "video block" to refer to a treeblock, i.e., LCU, or a CU, which includes a coding node and PUs and TUs. Thus, a video block may correspond to a coding node within a CU and video blocks may have fixed or varying sizes, and may differ in size according to a specified coding standard.

A PU may represent all or a portion of the corresponding CU, and may include data for retrieving a reference sample for the PU. PUs may have square or rectangular shapes. For example, if the CU in FIG. 2 is coded using an inter-prediction, it may be divided into four rectangular PUs where each PU includes information identifying a set reference samples in a temporally adjacent frame. The sets of reference samples may be combined to form a predictive video block. As described above, the predictive video block may be subtracted from the CU to form residual data.

As described above, a transform may be applied to residual data to transform the residual data from a pixel domain to a transform domain. A transform block or TU may correspond to a set of residual data to which a transform is applied. TUs represent the size of a set of pixel difference values for purposes of performing transformation and generating a corresponding set of transform coefficients. The size of a TU may be the same as the size of a CU or a CU may be partitioned into a plurality of TUs. For example, the CU illustrated in FIG. 2 one transform may be performed on the residual values associated with the 16×16 array of luma samples or a transform may be performed on each of four 8×8 arrays of luma samples. Larger TUs generally provide more compression with more perceivable "blockiness" in a reconstructed image, whereas smaller TUs generally provide less compression with less perceivable "blockiness." The selection of TU sizes may be based on rate-distortion optimization analysis.

Similar to an LCU, a TU may be recursively partitioned into smaller TUs. The TUs that result from partitioning a TUs into smaller TUs may be referred to as a transform block structure. An example of a transform block structure is the so-called tree structure. The tree structure may code a transform block as either being a whole TU or as being divided into a number of smaller TUs. This process can be done recursively for each block at every different decomposition level.

Figure 3:
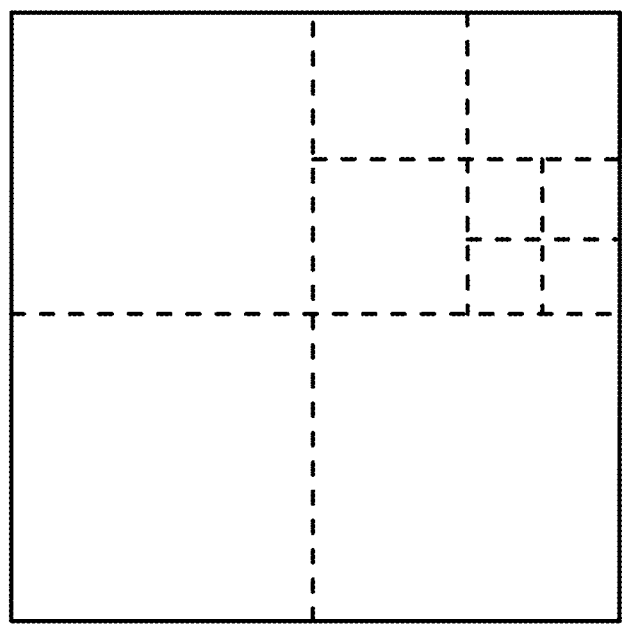
FIG. 3 is a conceptual diagram illustrating a quad-tree decomposition structure of a transform unit.

FIG. 3 is a conceptual diagram illustrating a quad-tree decomposition structure where a TU is either split or not split into four quarter-sized blocks at successive levels. In FIG. 3, the whole block with solid lines is the original TU, which may correspond to the original CU. The dashed lines indicate one outcome of transform block decomposition according to quad-tree structure. It should be noted that decomposition illustrated in FIG. 3 is one of several possible decomposition outcomes. As illustrated in FIG. 3, there are three levels of transform decompositions. At the first level (i.e., level-1 decomposition), the whole transform block is split into four quarter-sized blocks. Then, at the second level (i.e., level-2), the second quarter-sized transform block is further split into four 1/16 sized transform blocks. Then, at the third level (i.e., level-3), the fourth 1/16 sized transform block is further split into four even smaller transform blocks. During the encoding process, a video encoder may determine whether a transform block should be further split based on rate-distortion optimization analysis.

The decomposition technique illustrated in FIG. 3 is referred as a quad-tree decomposition structure, in which case a block is either split or not split into four quarter-sized blocks. In FIG. 3, blocks are only split into square shape sub-blocks. However, in other decomposition techniques, such as those described in HEVC WD4, a block can also be split into rectangular shaped sub-blocks for transform purposes.

Figure 4A:
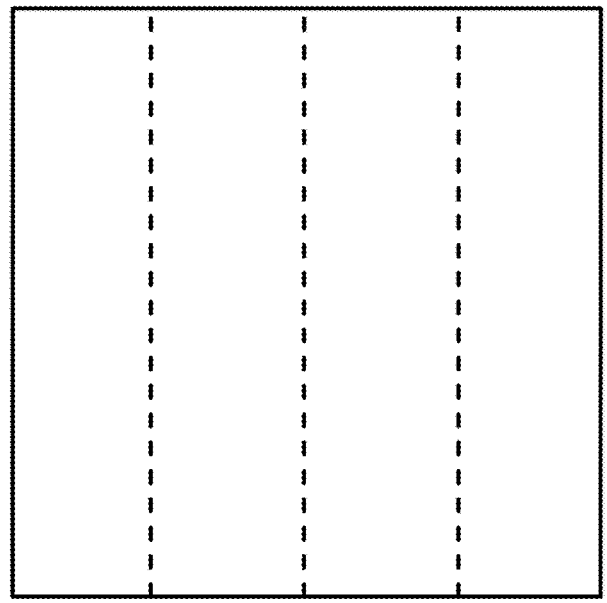
FIGS. 4A and 4B are conceptual diagrams illustrating a quad-tree decomposition structure of a transform unit.
Figure 4B:
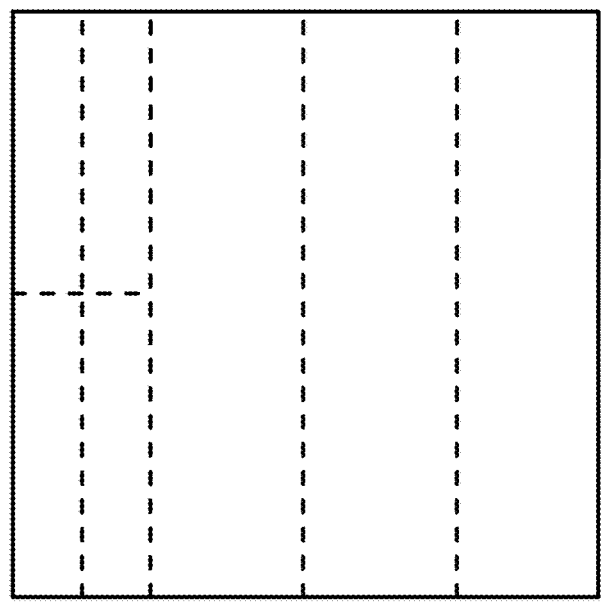

FIGS. 4A and 4B are conceptual diagrams illustrating a quad-tree decomposition structure where a TU is either split or not split into four non-square blocks. As illustrated in FIG. 4A, a TU can be partitioned into four smaller non-square blocks for transform purposes. Further, as illustrated in FIG. 4B, a non-square decomposition structure may also be recursive. For example, as illustrated in FIG. 4B, the first sub-block may be further partitioned into four even smaller non-square blocks with a size of 1/16th of the original block.

Figure 5:
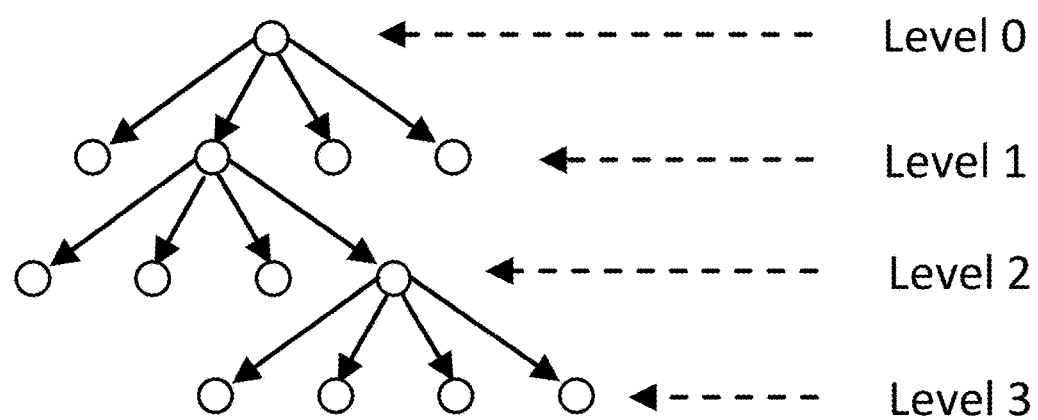
FIG. 5 is a conceptual diagram illustrating quad-tree decomposition levels.

To signal a tree decomposition structure in an encoded video bitstream, a transform split flag may be used. For each block, a transform split flag may be coded by a video encoder to indicate if a block is to be further split. FIG. 5 is a level diagram illustrating a quad-tree decomposition. FIG. 5 illustrates one example of a level diagram that may be used to signal the quad-tree decomposition illustrated in FIG. 3. Thus, FIG. 5 provides an alternative way of expressing a decomposition structure. As illustrated in FIG. 5, at different decomposition levels, a transform split flag can be signaled as follows:

Level 0: 1
Level 1: 0, 1, 0, 0
Level 2: 0, 0, 0, 1
Level 3: 0, 0, 0, 0

At level 0, which is the coding unit level, a flag of 1 is signaled because the transform is further split. At level 1, only the second quarter-sized block is further split, so flags of 0, 1, 0, 0 are sent in the encoded bitstream by the video encoder. At level 2, since other blocks are not further split, only the second quarter-sized block needs to be further signaled by a video encoder. In the second quarter-sized block, only the 4th block is to be further split, so flags of 0, 0, 0, 1 are sent at level 2 by the video encoder. At level 3, no block is to be further split, so flags of 0, 0, 0, 0 are sent. For clarification, it should be mentioned that in the present disclosure, a smaller level value means a higher level (i.e., a level closer to the root level) in the decomposition structure. As illustrated in FIG. 3 and FIG. 5, level 0 is the root level or top level.

In addition to split flags, HEVC WD4 includes a coded block flag (CBF) syntax element that indicates if a block of transform coefficients or transform coefficient levels includes any non-zero transform coefficients. Coded block flag signaling is closely associated with a transform block structure, and signaled by the video encoder in a top-down hierarchical manner. For example, when a coded block flag at a higher decomposition level is 0, then there is no further signaling of coded block flags at lower levels for that video component. In this case, the corresponding lower level coded block flags are all inferred to be 0. In other words, when the coded block flag is coded at a certain level of decomposition, coded block flags at lower levels are only needed when the coded block flag at the current decomposition level is not zero.

According to HEVC WD4, for a CU, its luma component Y and its chroma components, U and V, share the same quadtree decomposition structure for TU partitioning. This allows for only one transform split flag to be signaled per transform block, where the flag is shared among the Y, U and V components. However, as described above, under different color formats, the chroma components may have different sizes and shapes than the luma component. HEVC WD4 defines transforms of different shapes and sizes. However, not all sizes and shapes of transforms are defined and available for coding in HEVC WD4. In HEVC WD4, the following sizes of square shape transforms are defined as available for coding: 4×4, 8×8, 16×16 and 32×32. For non-square shape transforms, available transform sizes include 32×8, 8×32, 16×4 and 4×16. These transforms have a shape that is either square or rectangular with a height four times the width, or with a width four times the height. In other words, the aspect ratio of the rectangular transform sizes is either 1 to 4 or 4 to 1.

Figure 6:
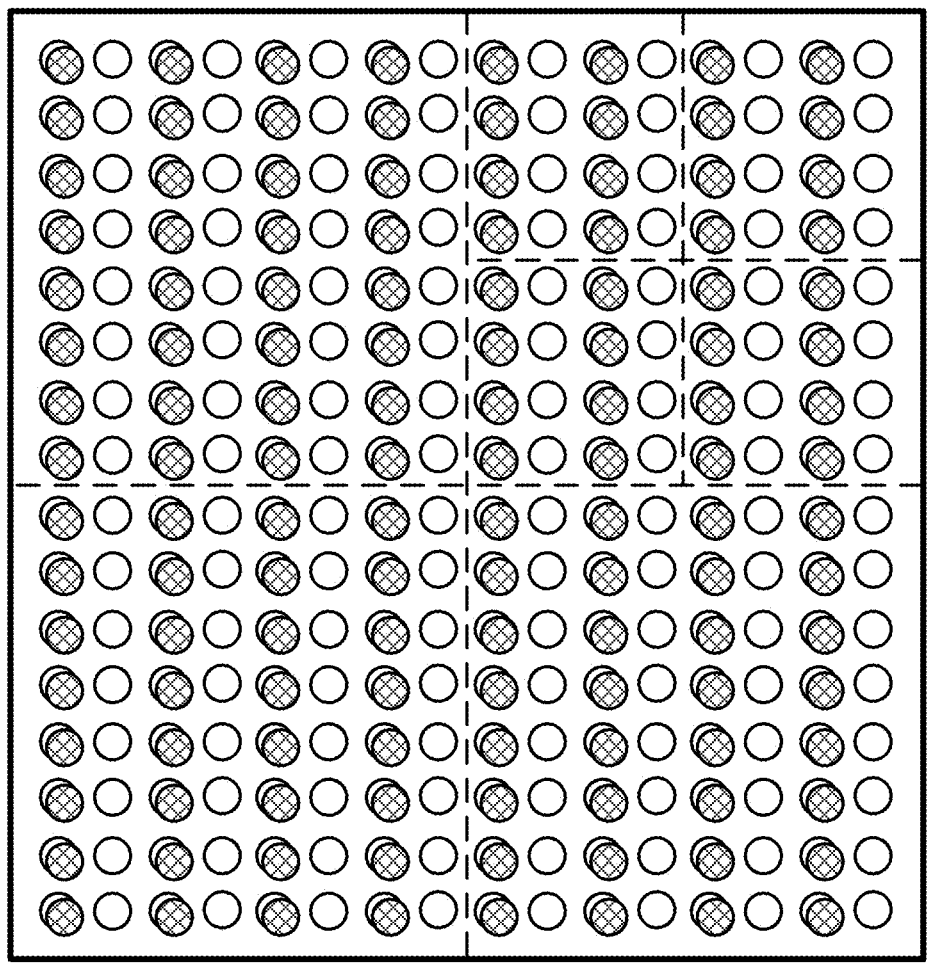
FIG. 6 is a conceptual diagram illustrating a TU quad-tree decomposition applied to a 16×16 coding unit formatted according to a 4:2:2 sample format.

FIG. 6 is a conceptual diagram illustrating an example quad-tree decomposition applied to a 16×16 CU formatted according to the 4:2:2 sample format. As illustrated in FIG. 6, the decomposition results in TUs of sizes 8×8 and 4×4 for the luma component and corresponding TUs of 4×8, 2×4 for each chroma component. While HEVC WD4 defines transforms for 8×8 and 4×4 sizes, HEVC does not define transforms for 4×8 and 2×4. Further, as illustrated in FIG. 1B and FIG. 2, for video formatted according to the 4:2:2 sample format, a chroma block has a rectangular shape with its height twice as long as its width. According to HEVC WD4 there are no transforms available with the required block shape, i.e., with an aspect ratio of 1:2 or 2:1. Thus, HEVC WD4 fails to provide TU shapes and sizes that correspond to the shape and sizes of chroma blocks formatted according to the 4:2:2 sample format. It should be noted, that the HEVC working drafts describe a main profile for video coding where the sample format of source video data is the 4:2:0 sample format and do not provide details for coding source video formatted according to a 4:2:2 or 4:4:4 sample format.

In view of the characteristics of the TU partitioning techniques described in HEVC WD4, the present disclosure describes techniques for synchronization of TU partitioning between samples of luma and chroma components in the case of a 4:2:2 sample format. In some examples, TU partitioning techniques for chroma components described herein may use the currently available transforms defined in HEVC WD4. As such, some of the partitioning techniques described herein may be incorporated into the HEVC standard coding process without the need to add addition transform shapes and size to the HEVC standard coding process. In one example, described herein, for a CU formatted according to the 4:2:2 sample format, TUs for chroma components may be partitioned such that they have the same aspect ratios as the corresponding TUs for the luma component. Further, the present disclosure provides techniques for coded block flag coding in the case of a 4:2:2 sample format. Examples of transform unit partitioning techniques in accordance with this disclosure are described in further detail below.

Figure 7:
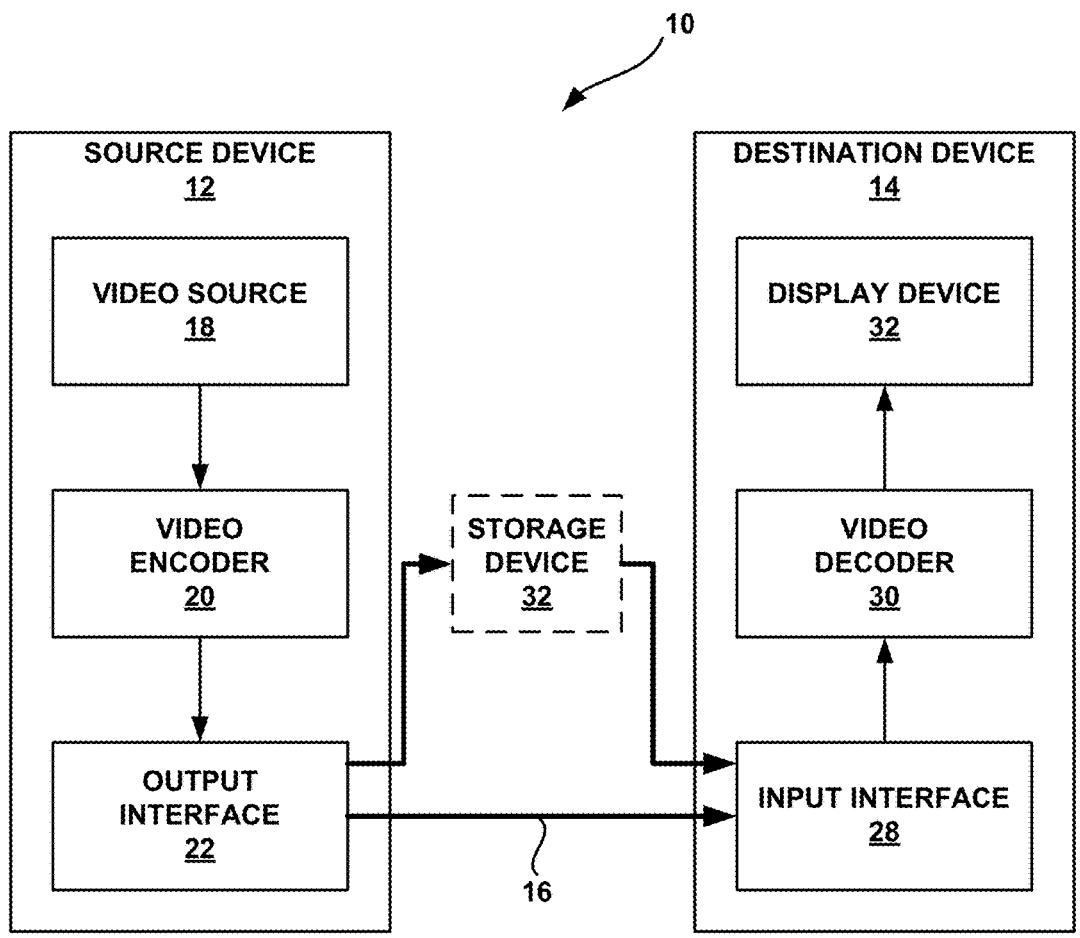
FIG. 7 is a block diagram illustrating an example video encoding and decoding system that may utilize the techniques described in this disclosure.

FIG. 7 is a block diagram illustrating an example video encoding and decoding system 10 that may utilize the techniques described in this disclosure. In particular, video coding system 10 may be configured to perform techniques for synchronizing the TU partitioning between samples of luma and chroma components when the 4:2:2 sample format is utilized. As illustrated in FIG. 7, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 7, source device 12 includes a video source 18, video encoder 20 and an output interface 22. In some cases, output interface 22 may include a modulator/demodulator (modem) and/or a transmitter. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

Video encoder 20 encodes the captured, pre-captured, or computer-generated video received from video source 18. The captured, pre-captured, or computer-generated video may be formatted according to any of the sample formats described above including the 4:2:0, 4:2:2 or 4:4:4 sample formats. Video encoder 20 may perform video coding on video formatted according to any of the 4:2:0, 4:2:2 or 4:4:4 sample formats. In some cases, video encoder 20 may up sample or down sample the captured, pre-captured, or computer-generated video as part of the coding process. For example, captured video may be formatted according to the 4:4:4 sample format, video encoder 20 may down sample captured video to the 4:2:2 format and perform video encoding on the down sampled video. The encoded video data may be transmitted directly to destination device 14 via output interface 22 of source device 20. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may generally conform to the current HEVC Test Model (HM) or a future HM. Alternatively, video encoder 20 and video decoder 30 may operate according to other proprietary or industry standards, such as the ITU-T H.264 standard, alternatively referred to as MPEG-4, Part 10, Advanced Video Coding (AVC), or revisions or extensions of such standards. The techniques of this disclosure, however, are not limited to any particular coding standard. Other examples of video compression standards include MPEG-2 and ITU-T H.263.

Although not shown in FIG. 7, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As described above, in HEVC WD4, a video frame or picture may be divided into a sequence of treeblocks or largest coding units (LCU) that include both luma and chroma samples. LCUs may be recursively split into CUs that include associated PUs and TUs. In some examples, the size of a CU may range from 8×8 samples up to the size of the treeblock with a maximum of 64×64 samples or greater. Further, in HEVC WD4, a video frame or picture may be partitioned into one or more slices, where a slice includes a number of consecutive LCUs in coding order. A video frame may be partitioned into slices based on coding modes associated with CUs included in a slice. For example, a slice may be defined such that all CUs included in the slice share a common coding mode, such as: skip mode, direct mode, intra-prediction mode, or inter-prediction mode.

A series of video frames or pictures may be coded as part of a coded video sequence of group of pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. As described herein, video encoder 20 typically operates on video blocks within individual video slices in order to encode the video data. However, video encoder 20 may also perform higher level video coding processes, such as partitioning a video frame into slices and/or generating GOP level or slice level syntax.

As described above, syntax data associated with CUs may describe the partitioning of a CU into one or more PUs. Syntax data associated with a CU may also describe, for example, partitioning of the CU into one or more TUs according to a quad-tree. In some examples, a PU or a TU can be square or non-square in shape. In general, a PU includes data related to the prediction process. For example, when the PU is intra-mode encoded, the PU may include data describing an intra-prediction mode for the PU. As another example, when the PU is inter-mode encoded, the PU may include data defining motion information for the PU. The data defining the motion information for a PU may describe, for example, a motion vector having a horizontal component, a vertical component, a resolution (e.g., one-quarter pixel precision or one-eighth pixel precision), a prediction direction indicating a reference picture list (e.g., List 0, List 1, or List C) for the motion vector, and a reference picture index indicating a reference picture to which the motion vector points within a reference picture list. Hence, a PU may be considered a basic unit for carrying information relating to the prediction process. In one example, video encoder 20 may be configured to encode video data according to the PU structures supported by the HEVC test model (HM).

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

As described above, a TU is the basic unit used for transform and quantization processes. A given CU having one or more PUs may also include one or more transform units (TUs). Further, in HEVC WD4 TUs may be sized based on the size of PUs within a given CU defined for a partitioned LCU, although this may not always be the case. The TUs may be the same size or smaller than the PUs. In some examples, residual samples corresponding to a CU may be subdivided into smaller units using a quad-tree structure known as "residual quad tree" (RQT). The leaf nodes of the RQT may be referred to as transform units (TUs).

Following intra- or inter-prediction, video encoder 20 may calculate residual video data corresponding to the PU. The residual values comprise pixel difference values representing differences between the pixel values of the original block to be coded and the pixel values of the predictive block formed by intra- or inter-prediction. The residual video data in the prediction unit, i.e., the residual pixel difference values, may be transformed into transform coefficients according to TU structure to produce transform coefficients. Hence, the residual data may be transformed from the pixel domain to a transform domain.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a pre-defined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, the TU decomposition structures described in the main profile of HEVC have various shortcomings when applied to video data formatted according to the 4:2:2 sample format. In addition to being configured to code video data according to the TU decomposition structures described in the main profile of HEVC, video encoder 20 and video decoder 30 may be configured to code video data using the TU partitioning techniques described herein.

In one example, video encoder 20 and video decoder 30 may be configured to partition a block of each chroma component included in video formatted according to the 4:2:2 sample format into a top chroma sub-block and a bottom chroma sub-block. In one example, each of the top and bottom sub-blocks of a given chroma component may be square. Further, the transform unit partitioning of both of the two chroma sub-blocks may be synchronized with the partitioning of the luma component. In this manner, in some cases, a transform unit of a chroma component may be partitioned such that it will have the same aspect ratio as the corresponding transform unit of the luma component, when video data formatted according to the 4:2:2 sample format.

FIGS. 8A-8D illustrate different cases of transform unit partitioning for video blocks formatted according to the 4:2:2 sample format. In each of FIGS. 8A-8D chroma components may be first partitioned into top and bottom sub-blocks prior to any partitioning based on the luma component. By partitioning the chroma components into top and bottom sub-blocks, alternative TU shapes and sizes may be generated for the chroma components when compared to a case where the chroma components are not first partitioned into top and bottom sub-blocks.

The video blocks in FIGS. 8A-8D may correspond to video blocks or CUs of any of the following sizes 4×4, 8×8, 16×16, 32×32, and 64×64. In general, by partitioning a chroma component into top and bottom sub-blocks, twice as many TUs are generated for the chroma component as compared to a case where the chroma component is not partitioned into top and bottom sub-blocks. Further, by partitioning a chroma component into top and bottom sub-blocks, TUs may be generated where a vertical or horizontal dimension of a TU is divided by two when compared to the case where the chroma component is not partitioned into top and bottom sub-blocks. Some specific cases of partitioning a CU into TUs when the chroma components are partitioned into top and bottom sub-blocks are described in detail below. It should be noted however that for the sake of brevity all possible TU partition combinations that may be derived from partitioning the chroma components into top and bottom sub-blocks have not been described in detailed, but the partitioning techniques described with respect to FIGS. 8A-8D may be applied at various levels of decomposition.

Figure 8A:
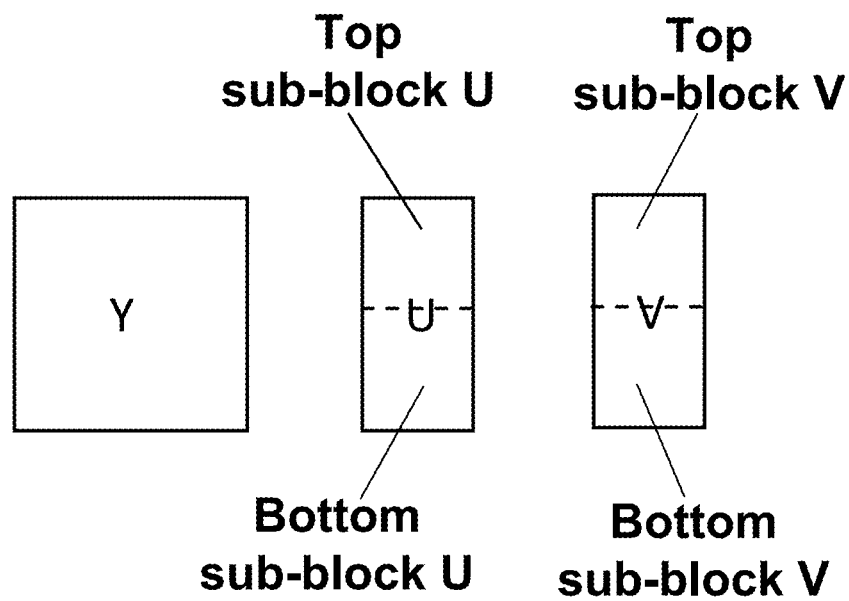
FIGS. 8A-8D are conceptual diagrams illustrating techniques for transform unit partitioning for a video block.

FIG. 8A illustrates example transform units based on a partitioning structure where the chroma components are partitioned into top and bottom sub-blocks and no additional partitioning based on the luma component is applied. As illustrated in FIG. 8A, a luma block is not further split and each of the corresponding chroma blocks is partitioned into a top sub-block and a bottom sub-block. In the example illustrated in FIG. 8A, the determination to further partition the chroma components after the chroma blocks are partitioned into a top sub-block and a bottom sub-block may be based on the partitioning of the luma component. Thus, in the example illustrated in FIG. 8A, each of the chroma components may not be further split because the luma block is not further split.

In one example, the CU associated with the TU partitioning illustrated in FIG. 8A may be an 8×8 CU. In this case, the partitioning of the chroma components into top and bottom sub-blocks results in an 8×8 TU for the luma component and two 4×4 TUs for the chroma components. This case can be contrasted to a case where the chroma components are not partitioned into top and bottom sub-blocks, which would result in an 8×8 TU for the luma component and a 4×8 TU for the chroma components. As described above, a 4×4 TU may be defined for HEVC whereas a 4×8 TU may not be defined or available. Thus, the partitioning of the chroma components into top and bottom sub-blocks may result in more useful TU shapes and sizes.

In general, the CU associated with the TU partitions illustrated in FIG. 8A may be described as an N by N CU. The partitioning of the chroma components into top and bottom sub-blocks results in two N/2 by N/2 TUs as opposed to one N/2 by N TU in the case where the chroma components are not partitioned into top and bottom sub-blocks. Thus, partitioning the chroma components into top and bottom sub-blocks results in two square TUs compared to one rectangular TU with an aspect ratio of 1 to 2 in the case where the chroma components are not split into top and bottom sub-blocks. As pointed out above, in this example, each of the chroma sub-blocks has the same aspect ratio as the luma block. It should be noted that in other examples, the techniques described with respect FIG. 8A may be applied to 4×4, 16×16, 32×32 or 64×64 CUs. For the sake of brevity, the corresponding luma and chroma TU sizes for possible CU sizes are not described in detail.

Figure 8B:
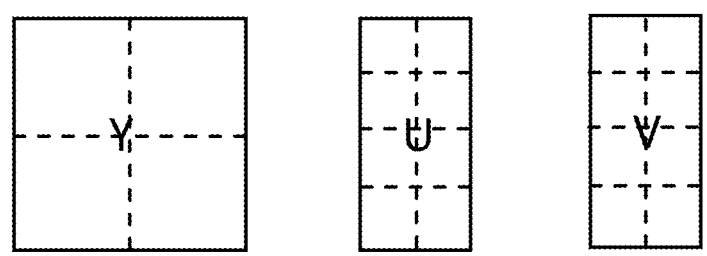

FIG. 8B illustrates example transform units based on a partitioning structure where the chroma components are partitioned into top and bottom sub-blocks and additional quad-tree partitioning is applied. As illustrated in FIG. 8B, a luma block is split into four square shaped sub-blocks for transform purposes. The corresponding chroma blocks are each partitioned into a top sub-block and a bottom sub-block, which are both square, and then each of the top and bottom sub-blocks are further partitioned into four square-shaped blocks with even smaller sizes. In general, the CU in FIG. 8B may be described as an N by N CU. The partitioning of the luma component results in four N/2 by N/2 TUs. The partitioning of the chroma components into top and bottom sub-blocks results in eight N/4 by N/4 TUs as opposed to four N/4 by N/2 TUs in the case where the chroma components are not partitioned into top and bottom sub-blocks. Thus, partitioning the chroma components into top and bottom sub-blocks results in eight square TUs compared to four rectangular TUs with an aspect ratio of 1 to 2 in the case where the TUs are not one split into top and bottom sub-blocks. It should be noted that the CU in FIG. 8B may be a 4×4, 8×8, 16×16, 32×32 or a 64×64 CU.

Figure 9:
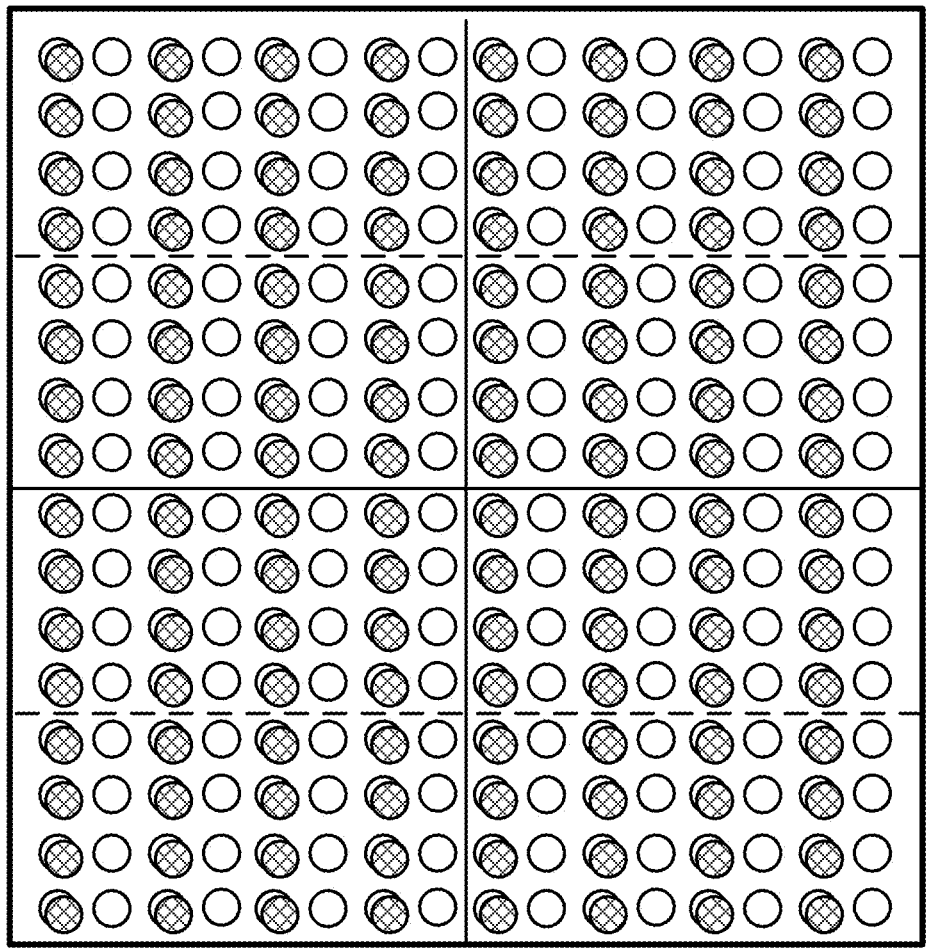
FIG. 9 is a conceptual diagram illustrating techniques for transform unit partitioning for a 16×16 video block formatted according to a 4:2:2 sample format.
Figure 10A:
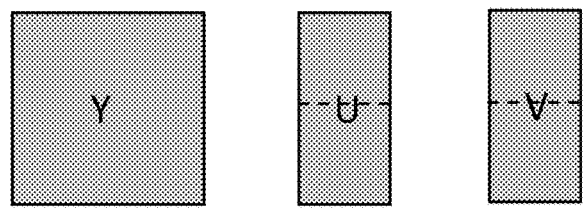
FIGS. 10A-10D are conceptual diagrams illustrating techniques for block association for coded block flag coding.
Figure 10B:
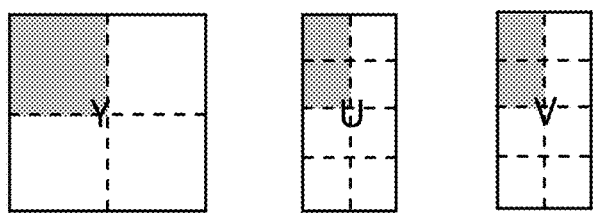
Figure 10C:
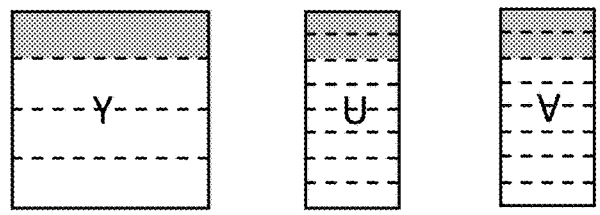
Figure 10D:
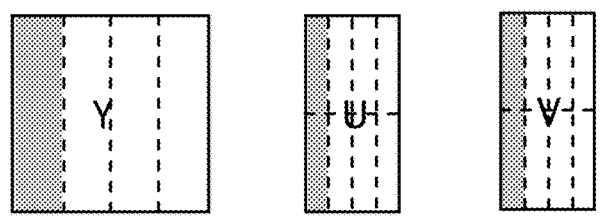

FIG. 9 illustrates the TU partitioning of the chroma components for the example chroma TU partitioning technique described with respect to FIG. 8B in the case where the CU is an 16×16 CU. In the example illustrated in FIG. 9, solid lines represent the partitioning of the luma component and the solid and dashed lines represent the partitioning of the chroma components. Thus, as illustrated in FIG. 9, the partitioning technique results in eight 4×4 TUs for each of the chroma components and four 8×8 TUs for the luma component. The example illustrated in FIG. 9 may be contrasted to the case where the chroma components are not partitioned into top and bottom sub-blocks, which would result in four 4×8 TUs for the chroma components. As described above, a 4×4 TU may be defined for HEVC and a 4×8 TU may not be defined. Thus, the partitioning of the chroma components into top and bottom sub-blocks may allow for more useful TU shapes and size. In another example, the partitioning technique described with respect to FIG. 8B may be applied to a 32×32 CU and may result in four 16×16 TUs for luma and eight 8×8 TUs for chroma. In another example, the partitioning technique described with respect to FIG. 8B may be applied to a 64×64 CU and may result in four 32×32 TUs for luma and eight 16×16 TUs for chroma.

Further, it should be noted that for some CU sizes the partitioning techniques described with respect to FIGS. 8A-8B may result in TU sizes that are not defined in HEVC. In such cases, the splitting of the chroma components into top and bottom sub-blocks may be selectively applied such that the splitting results in TUs that are defined in HEVC. For example, if splitting the chroma components into top and bottom sub-blocks into would result in 2×2 TUs, which may be smaller than a minimum TU size, a determination may be made not to split the chroma components into top and bottom sub-blocks for this particular CU size.

For example, for an 8×8 luma block, the corresponding chroma blocks may have a size of 4×8 according to the 4:2:2 format. If the 8×8 luma block is split into four 4×4 blocks, each chroma block may be partitioned into a 4×4 top sub-block and a 4×4 bottom sub-block. However, in this case, there may be no further splitting of the sub-blocks of the chroma components because there is no square shape transform with a size smaller than 4×4 defined in HEVC. Hence, the splitting of the chroma components into top and bottom sub-blocks may be limited by the minimum square shape transform size. In this manner, the partitioning of each of the luma and chroma components may be selectively applied to yield transform units to which available transforms may be applied. In one example, the following sizes of square shape transforms may be defined and available for coding: 4×4, 8×8, 16×16 and 32×32 and the following non-square shape transforms may be defined and available for coding: 32×8, 8×32, 16×4 and 4×16.

Figure 8C:
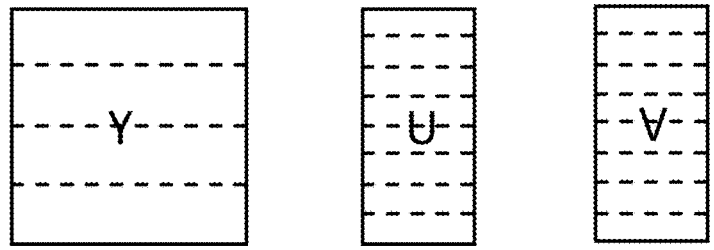
Figure 8D:
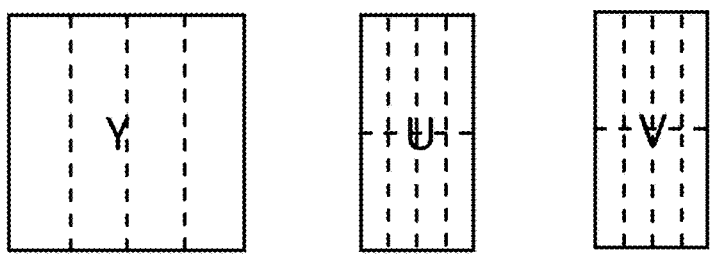

As described above, a CU may be partitioned into non-square rectangular TUs. FIGS. 8C and 8D illustrate examples transform units based on a partitioning structure where the chroma components are partitioned into top and bottom sub-blocks and additional non-square, rectangular partitioning is applied. FIG. 8C illustrates example transform units based on a partitioning structure where the chroma components are partitioned into top and bottom sub-blocks and additional horizontal non-square, rectangular partitioning is applied.

As illustrated in FIG. 8C, a luma block is split into four horizontally oriented non-square, rectangular shaped sub-blocks. The corresponding chroma blocks are each partitioned into a top sub-block and a bottom sub-block, which are both square, and then each of the two top and bottom sub-blocks is further partitioned into four horizontally oriented non-square-shaped rectangular blocks with even smaller sizes. In general, the CU in FIG. 8C may be described as an N by N CU. The partitioning of the luma component into non-square rectangular CUs may result in four N by N/4 TUs. The partitioning of the chroma components into top and bottom sub-blocks may result in eight N/2 by N/8 TUs as opposed to four N/2 by N/4 TU in the case where the chroma components are not partitioned into top and bottom sub-blocks. Thus, partitioning the chroma components into top and bottom sub-blocks results in eight non-square rectangular TUs with an aspect ratio of 4 to 1 compared to four non-square rectangular TUs with an aspect ratio of 2 to 1 in the case where the TUs are not split into top and bottom sub-blocks.

In one example, the CU associated with the TU partitioning illustrated in FIG. 8C may be a 32×32 CU. Thus, the partitioning technique described with respect to FIG. 8C may result in four 32×8 TUs for the luma component and eight 16×4 TUs for the chroma components. This example may be contrasted to the case where the chroma components are not partitioned into top and bottom sub-blocks, which would result in four 16×8 TUs for the chroma components. As described above, a 16×4 TU may be defined for HEVC and a 16×8 TU may not be defined. Thus, the partitioning of the chroma components into top and bottom sub-blocks may allow for more useful TU shapes and sizes. It should be noted that in other examples the CU in FIG. 8C may be a 4×4, 8×8, 16×16, or a 64×64 CU.

FIG. 8D illustrates example transform units based on a partitioning structure where the chroma components are partitioned into top and bottom sub-blocks and additional vertical non-square, rectangular partitioning is applied. As illustrated in FIG. 8D, a luma block is split into four vertically oriented non-square, rectangular shaped sub-blocks for transform purposes. The corresponding chroma blocks are each partitioned into a top sub-block and a bottom sub-block, which are both square, and then each of the two top and bottom sub-blocks are further partitioned into four vertically oriented non-square-shaped rectangular blocks with even smaller sizes. In general, the CU in FIG. 8D may be described as an N by N CU. The partitioning of the luma component into non-square rectangular CUs may result in four N/4 by N TUs. The partitioning of the chroma components into top and bottom sub-blocks may result in eight N/8 by N/2 TUs as opposed to four N/8 by N TUs in the case where the chroma components are not partitioned into top and bottom sub-blocks. Thus, partitioning the chroma components into top and bottom sub-blocks results in eight non-square rectangular TUs with an aspect ratio of 1 to 4 compared to four non-square rectangular TUs with an aspect ratio of 1 to 8 in the case where the TUs are not one split into top and bottom sub-blocks.

In one example, the CU associated with the TU partitioning illustrated in FIG. 8D may be a 32×32 CU. Thus, the partitioning technique described with respect to FIG. 8D may result in four 8×32 TUs for the luma component and eight 4×16 TUs for the chroma components. This example may be contrasted to the case where the chroma components are not partitioned into top and bottom sub-blocks, which would result in four 4×32 TUs for the chroma components. As described above, a 4×16 TU may be defined for HEVC and a 4×32 TU may not be defined. Thus, the partitioning of the chroma components into top and bottom sub-blocks may allow for more useful TU shapes and sizes. It should be noted that in other examples the CU in FIG. 8D may be a 4×4, 8×8, 16×16, or a 64×64 CU.

Further, it should be noted, as described above with respect to FIGS. 8A-8B, for some CU sizes, the partitioning techniques described with respect to FIGS. 8C-8D may result in TU sizes that are not defined in HEVC. Thus, in such cases, the splitting of the chroma components into top and bottom sub-blocks may be selectively applied such that the splitting results in TUs that are defined in HEVC, or another applicable video coding standard or process. In one example, the defined non-square rectangular TUs may include 32×8, 8×32, 16×4, and 4×16 TUs.

Further, for each of the examples described with respect to FIGS. 8A-8D, when the chroma components are split into top and bottom sub-blocks and further transform unit partitioning is synchronized with the luma component, for each non-split luma transform unit under 4:2:2 format, there will generally be two non-split chroma TUs available from each chroma component. However, in some cases, a luma block may be further split, but the corresponding chroma blocks may not be further split if splitting the chroma blocks would result in an unavailable TU or a TU below a minimum transform unit size for an applicable video coding standard or process, such as HEVC.

Thus, each of FIGS. 8A-8D illustrates a case where for a video block formatted according to the 4:2:2 sample format, a chroma block corresponding to a luma block may be partitioned into top and bottom, square sub-blocks and if the luma bock is further partitioned, the top and bottom sub-blocks may be partitioned in a similar manner. For example, these techniques may be applied for square sub-block partitions in the case of square luma block partitioning, horizontally oriented sub-block partitions in the case of horizontally oriented luma block partitioning, or vertically oriented sub-block partitions in the case of vertical oriented luma block partitioning. Further, in some cases, as an exception, if the luma block is partitioned, but the corresponding chroma block has already reached the minimum size of transforms after splitting into a top sub-block and a bottom sub-block, the two sub-blocks of each chroma component may not further split. Thus, according to the techniques described with respect to FIGS. 8A-8D under the 4:2:2 format, in some examples, a transform unit for chroma components may have the same aspect ratio as its corresponding transform unit of luma component. As a result, transforms defined in HEVC WD4 or WD8 may be sufficient for performing transforms on the resulting TUs formed using the techniques described with respect FIGS. 8A-8D. Thus, in some examples, the techniques described with respect to FIGS. 8A-8D may be incorporated into HEVC without defining additional transform shapes and sizes.

In this manner, video encoder 20 may be configured to receive an N by N array of values for a luma component of video data, receive a corresponding N/2 by N array of values for a chroma component of video data, and partition the N/2 by N array of values for the chroma component into two N/2 by N/2 sub-arrays and perform a transform operation on each of the sub-arrays of chroma values. Video decoder 30 may be configured to receive arrays and sub-arrays generated by a video encoder and perform reciprocal transform operations.

Further, as described above, HEVC WD4 includes a coded block flag syntax element that indicates if a block of transform coefficients or transform coefficient levels includes any non-zero transform coefficients. In one example, video encoder 20 and video decoder 30 may be further configured to code video data using techniques for coded block flag coding described herein. In some examples, coded block flag coding may only be used for inter-prediction modes. This may be due to the fact that intra-prediction modes are more likely to result in non-zero transform coefficients for a video block.

In one example, video encoder 20 and video decoder 30 may be configured to use a joint coded block flag. For example, in coding the coded block flag for a transform unit of a chroma component, for each chroma component, a joint coded block flag may first be signaled for each pair of chroma transform units of a chroma component. If the joint coded block flag indicates that there is at least one non-zero coefficient in the pair of chroma transform units, one or more additional coded block flags may be sent to signal if each of two transform units has any non-zero transform coefficients. Otherwise, if the joint coded block flag indicates that there is not at least one non-zero coefficient in the pair of chroma transform units, no further signaling is needed for transform units for the pair of chroma components. In one example the chroma components may correspond to chroma components of video data formatted according to the 4:2:2 sample format.

FIGS. 10A-10D are conceptual diagrams illustrating techniques for block association for coded block flag coding. In FIGS. 10A-10D the respective transform unit partition structures illustrated in FIGS. 8A-8D are illustrated with an indication of video components that may share a joint coded block flag. It should be noted that while the examples in FIGS. 10A-10D correspond to the transform units illustrated in FIGS. 8A-8D, joint coded block flag coding may be utilized with other transform unit partitioning structures. Further, while the joint coded block flag coding techniques described herein may be particularly useful for video data formatted according to the 4:2:2 sample format, such techniques may be also be applied to video data formatted according to the 4:2:0 or 4:4:4 sample formats.

As illustrated in FIGS. 10A-10D, a TU for the luma component is shaded and two corresponding TUs are shaded for each of the chroma components. The shaded TUs may represent the TUs associated with a coded block flag. As illustrated in FIGS. 10A-10D, two TUs are shaded for each of the chroma components. In this manner, a joint coded block flag may be associated with the two shaded TUs of a chroma component. Further, it should be noted that in FIGS. 10B, 10C and 10D, only the first non-split luma block and its associated chroma blocks are indicated in the shaded areas. However, it is apparent that, in these cases, each of the other three non-split luma blocks may also have two respective chroma blocks associated with a joint coded block flag for each chroma component. For example, in FIG. 10C the second horizontal luma TU may be associated with the third and fourth horizontal TUs of the chroma components. Further, in some examples, a high level coded block flag that indicates whether any of the components includes any non-zero coefficients may be used to determine whether any additional coded code block flags are to be signaled.

According to one example, a joint coded block flag may first be signaled for each pair of chroma transform units of a chroma component. If the joint coded block flag has a value (e.g., 1) indicating that there is at least one non-zero coefficient in the pair of chroma transform units, one or more additional coded block flags may be sent to signal if each of two transform units has any non-zero coefficients. Otherwise, if the joint coded block flag has a value (e.g., 0) indicating that there is not at least one non-zero coefficient, no further signaling is needed for the pair of chroma transform units of a chroma component. For example, in FIG. 10B, for the U component, a joint coded block flag can be first signaled by the video encoder 20 in the encoded bitstream to indicate if there are any non-zero coefficients in the pair of chroma transform units, i.e., the top and bottom sub-blocks, indicated in the shaded area, for the U component. As described above, the chroma transform units may also be referred to as sub-blocks, where the sub-blocks correspond to transform units. If the joint coded block flag has a value (e.g., 0) indicating there is no non-zero coefficient, no further signaling is needed for these two transform units of the U component. Otherwise, one or more additional coded block flags can be signaled for each of the two transform units in the U component to indicate if there is any non-zero coefficient in each transform unit. Thus, if the joint coded block flag indicates that there is no non-zero coefficient in either the top transform unit or the bottom transform unit, then no further signaling is needed for the transform units corresponding to this pair of transform unit.

If the joint coded block flag for the chroma component indicates that there is at least one non-zero coefficient in the top transform unit or the bottom transform unit, however, then the video encoder 20 may generate a coded block flag for the top transform unit indicating whether there is at least one non-zero coefficient in the top transform unit, and generate another coded block flag for the bottom transform unit indicating whether there is at least one non-zero coefficient in the bottom transform unit. In one example, the signaling of the coded block flag may be performed in the same way for each of the U component and the V components.

In one example, in the case where a joint coded block flag for a pair of chroma transform units has a value (e.g., 1) indicating that there is at least one non-zero coefficient in the pair of chroma transform units, and the additional coded block flag signaled for the first transform unit of this pair has a value (e.g., 0) indicating that there are no non-zero coefficients in it, then, in this case, the second transform unit must have at least one non-zero transform coefficient and the value of its coded block flag can be inferred (e.g., 1). In this case, there is no need to signal the coded block flag for the second transform unit of this pair because it is known that the second transform unit must include a nonzero coefficient given the joint coded block flag, which indicates that either the top or bottom transform unit includes a non-zero transform coefficient, and given the first coded block flag sent for the top transform unit, which indicates that the top transform unit does not include a non-zero transform coefficient.

Figure 11:
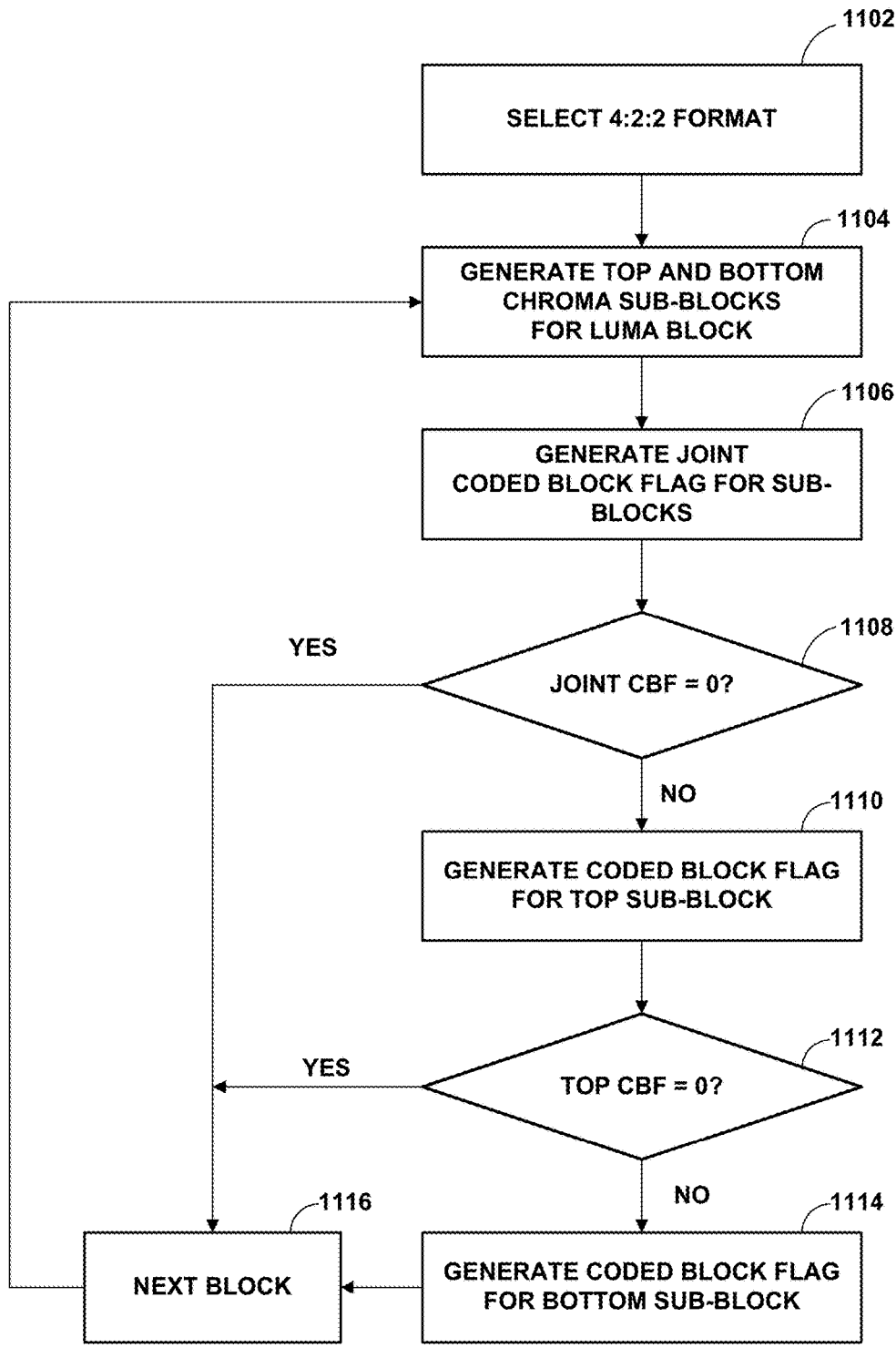
FIG. 11 is a flowchart illustrating an example method for transform unit partitioning and block association for coded block flag coding for chroma blocks.

FIG. 11 is a flowchart illustrating an example of a method for transform unit partitioning and block association for coded block flag coding for chroma components as described in this disclosure. The method illustrated in FIG. 11 is described as being performed by video encoder 20. However, such a description is for illustrative purposes and the method illustrated in FIG. 11 may be performed by any combination of components included in a video encoder. Examples of components of a video encoder are described in further detail below with respect to video encoder 20 described in FIG. 12. Further, it should be noted that a reciprocal method to the method illustrated in FIG. 11 may be performed by video decoder 30 or any combination of components included in a video decoder. Examples of components of a video decoder are described in further detail below with respect to FIG. 14. It should be noted that in the reciprocal process a video decoder may receive or obtain video blocks and syntax elements from an encoded bitstream.

As shown in the example method illustrated in FIG. 11, video encoder 20 selects a 4:2:2 sample format of video data (1102). In other examples, video encoder 20 may select other sample formats, such as the 4:2:0 and 4:4:4 sample formats described above. Video encoder 20 generates, for a luma block, corresponding top and bottom sub-blocks for chroma component U, and corresponding top and bottom sub-blocks for chroma component V (1104). The corresponding chroma sub-blocks can be generated at successive decomposition levels for each luma sub-partition, subject to a minimum transform unit size, as described above. Video encoder 20 determines whether either of the pair of sub-blocks includes at least one non-zero coefficient and generates a joint coded block flag (CBF) (1106). In one example, the joint CBF may have a value of zero if there are no non-zero coefficients both of the sub-blocks and a value of one if there are non-zero coefficients in either of the sub-blocks of the respective chroma components (U or V). If there are no non-zero coefficients and the joint CBF equals zero, no further signaling is needed for the chroma component and video encoder 20 may then proceed to process the next luma block (1116).

However, if the joint CBF equals one (1108), video encoder 20 generates a coded block flag for the top sub-block to indicate whether the top chroma sub-block includes any nonzero transform coefficients (1110). Video encoder 20 may determine if the CBF for the top chroma sub-block equals zero (1112). If the CBF for the top chroma sub-block equals zero, then in some examples it can be inferred that the bottom sub-block must include a nonzero transform coefficient. In this case, there is no need to generate a coded block flag for the bottom sub-block, and the video encoder 20 can proceed to process the next luma block (1116).

However, if the CBF for the top chroma sub-block equals one, it is clear that the top sub-block includes at least one non-zero transform coefficient, but it is also possible that the bottom sub-block may include at least one non-zero transform coefficient. Accordingly, in this case, video encoder 20 generates a CBF for the bottom sub-block with a value of zero in the event the bottom chroma sub-block includes no non-zero transform coefficients and a value of one in the event the bottom chroma sub-block includes at least one nonzero transform coefficient (1114). Video encoder 20 then proceeds to process the next luma block (1116). In some examples, the next luma block may be a different luma block or a luma block generated by further partitioning of a luma block.

The process described with reference to FIG. 11 may be performed in the same manner for both U and V chroma components corresponding to a given luma component. In addition, video decoder 30 may parse and decode a bitstream in a reciprocal or inverse manner to obtain transform coefficients for luma and chroma blocks having a 4:2:2 sample format.

In this manner, video encoder 20 and video decoder 30 represent examples of video coders configured to code a joint coded block flag for the chroma sub-blocks, wherein the joint coded block flag indicates whether the chroma sub-blocks include at least one nonzero transform coefficient. In addition, the method may further comprise, when the joint coded block flag indicates that the chroma sub-blocks include at one nonzero transform coefficient, coding a coded block flag for a first one of the chroma sub-blocks, wherein the coded block flag indicates whether the first one of the chroma sub-blocks includes at least one nonzero coefficient.

Further, the method may comprise, when the coded block flag indicates that the first one of the chroma sub-blocks does not include at least one nonzero coefficient, not coding a coded block flag for a second one of the chroma sub-blocks, and, when the coded block flag indicates that the first one of the chroma sub-blocks does include at least one nonzero coefficient, coding a coded block flag for the second one of the chroma sub-blocks, wherein the coded block flag for the second one of the chroma sub-blocks indicates whether the second one of the chroma sub-blocks includes at least one nonzero transform coefficient.

As discussed above, the coding operations are performed by a video encoder as encoding operations, or by a video decoder as decoding operations. Using the techniques described in this disclosure, the video encoder 20 or video decoder 30 may be configured apply transforms of a size and shape consistent with the HEVC standard to the blocks and sub-blocks.

Although a discussion of CU, PU and TU processing and arrangement according to the HM of HEVC is provided for purposes of illustration, such discussion should not be considered limiting of the techniques of this disclosure as broadly exemplified and described herein. Transform unit partitioning and coded block flag signaling techniques, as well as other techniques, described in this disclosure, may be broadly applicable to any of a variety of existing or future video coding processes, including without limitation video coding processes formulated to conform to the HEVC standard.

The video encoder 20 may implement any or all of the techniques of this disclosure for coding transform coefficients. Likewise, the video decoder 30 may implement reciprocal versions of any or all of these techniques for coding transform coefficients. A video coder, as described in this disclosure, may refer to a video encoder or a video decoder. Similarly, a video coding unit may refer to a video encoder or a video decoder. Likewise, video coding may refer to video encoding or video decoding.

Figure 12:
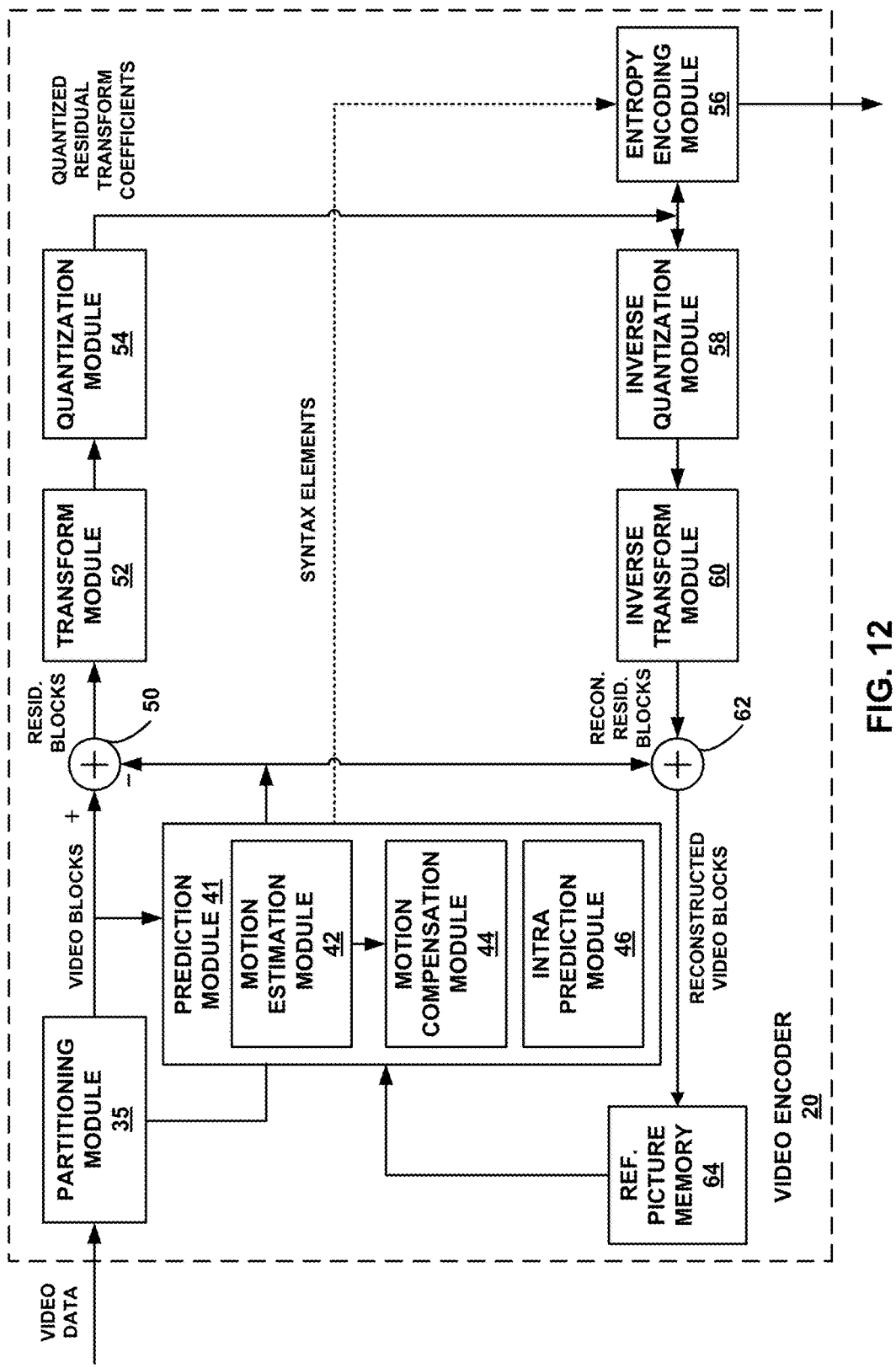
FIG. 12 is a block diagram illustrating an example video encoder that may implement the techniques described in this disclosure.

FIG. 12 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 12, video encoder 20 includes a partitioning module 35, prediction module 41, reference picture memory 64, summer 50, transform module 52, quantization module 54, and entropy encoding module 56. Prediction module 41 includes motion estimation module 42, motion compensation module 44, and intra prediction module 46. For video block reconstruction, video encoder 20 also includes inverse quantization module 58, inverse transform module 60, and summer 62. A deblocking filter (not shown in FIG. 12) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 12, video encoder 20 receives video data, and partitioning module 35 partitions the data into video blocks. Partitioning module 35 may work in conjunction with prediction module 41 to determine how to partition video data. In some cases, partitioning module and/or prediction module 41 may partition video data based on a rate distortion analysis. Received video data may be formatted according to any of the sample formats described above. For example, video data may be formatted according to the 4:2:2 sample format. Partitioning may include partitioning video data into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). In some examples, partition module 35 may partition video data according to the techniques described above with respect to FIGS. 8A-8D and FIG. 9. For example, partitioning module 35 may partition video data such that an N by N array of residual values for a luma component of video data and two corresponding N/2 by N/2 sub-array of residual values for a chroma component are generated as a result of the predictive coding process.

Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression.

Motion estimation module 42 may be configured to determine the inter-prediction mode for a video slice according to a predetermined pattern for a video sequence. The predetermined pattern may designate video slices in the sequence as P slices, B slices or generalized P/B (GPB) slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

A predictive block, for inter-coding, may be a block that is found to closely match the PU of the video block to be coded in terms of pixel difference, which may be determined by sum of absolute difference (SAD), sum of square difference (SSD), or other difference metrics. Alternatively, a predictive block, for intra-coding, may be a block that is formed based on spatial prediction with respect to pixel values from one or more neighboring blocks. In some examples, for inter-prediction, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists.

Video encoder 20 forms a residual video block, for inter or intra coding, by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select module 40, in some examples) may select an appropriate intra-prediction mode to use from the tested modes.

For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block. It should be noted that rate-distortion analysis may be performed on an combination of the color components.

In any case, after selecting an intra-prediction mode for a block, intra-prediction module 46 may provide information indicative of the selected intra-prediction mode for the block to entropy coding module 56. Entropy coding module 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter prediction or intra prediction, video encoder 20 forms a residual video block by subtracting the predictive block from the current video block. The residual video data in the residual block may be included in one or more TUs and applied to transform module 52. Note that transform module 52 refers to a component, module or functional unit of video encoder 20, and should not be confused with a TU, which is a basic unit of data for the transform and quantization process. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain. Transform module 52 may send the resulting transform coefficients to quantization module 54.

As described above, in some examples, partition module 35 may partition video data according to the techniques described above with respect to FIGS. 8A-8D and FIG. 9. Transform module 52 may also partition video data according to the techniques described above. In one example, transform module 52 may be configured to receive an N by N array of residual values for a luma component of video data, receive a corresponding N/2 by N array of residual values for a chroma component of video data, partition the N/2 by N array of residual values for the chroma component into two N/2 by N/2 sub-arrays of chroma residual values, and generate transform coefficients for the chroma component by performing a transform on each of the sub-arrays of chroma residual values.

It should be noted that the techniques described herein may be generally performed by video encoder 20 and the components included in video encoder may perform different aspects of the techniques described herein. For example, according to the techniques described here partitioning module 35 may initially partition video data for purposes of generating residual values and transform module 52 may further partition video data for purposes of generating transform coefficients.

Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors and the other syntax elements for the current video slice being coded.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64. The reference block may be used by motion estimation module 42 and motion compensation module 44 as a reference block to inter-predict a block in a subsequent video frame or picture.

In this manner, video encoder 20 of FIG. 12 represents an example of a video encoder configured to receive an N by N array of residual values for a luma component of video data, receive a corresponding N/2 by N array of residual values for a chroma component of video data, partition the N/2 by N array of residual values for the chroma component into two N/2 by N/2 sub-arrays of chroma residual values, and generate transform coefficients for the chroma component by performing a transform on each of the sub-arrays of chroma residual values, in accordance with the techniques described in this disclosure. Video encoder 20 may generate two N/2 by N/2 sub-arrays of transform coefficients for each chroma component corresponding to the luma component.

Figure 13:
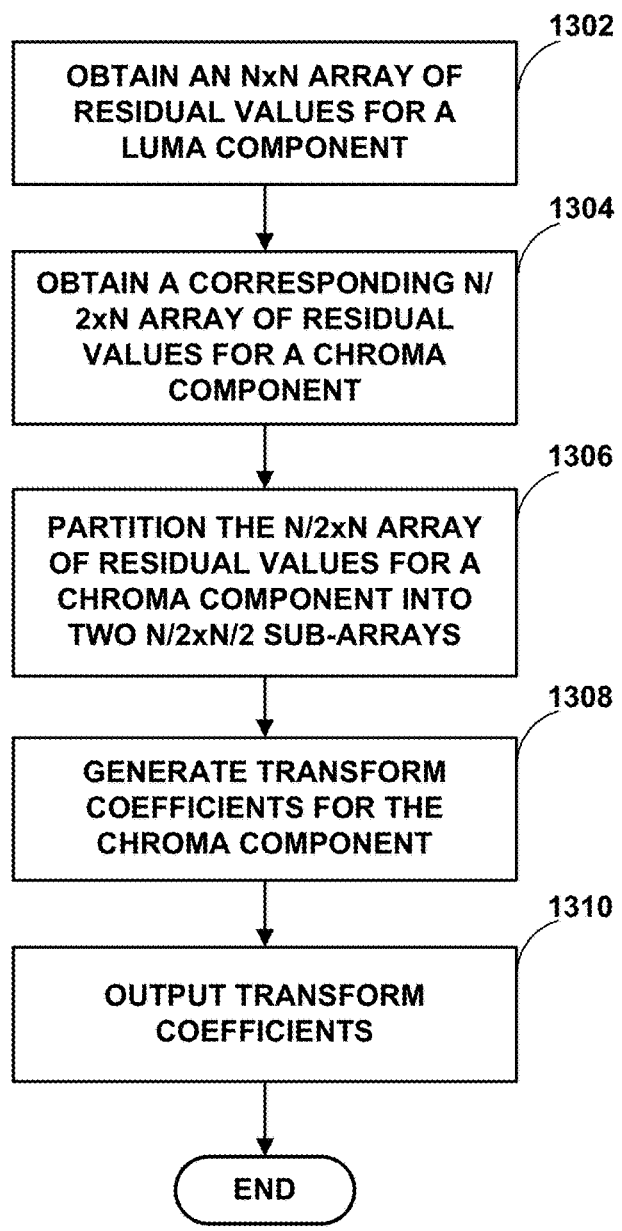
FIG. 13 is a flowchart illustrating an example method for partitioning of residual values and generating transform coefficients for chroma blocks.

FIG. 13 is a flowchart illustrating an example method for partitioning residual values and generating transform coefficients for chroma blocks. Although the process in FIG. 13 is described below with respect to video encoder 20, the process may be performed by any combination of video encoder 20, partitioning module 35, transform module 52 and/or other components of video encoder 20.

As illustrated in FIG. 13, video encoder 20 obtains an N by N array of residual values for a luma component of video data (1302). Video encoder 20 obtains a corresponding N/2 by N array of residual values for a chroma component of video data (1304). It should be noted that obtaining an array of residual values may refer to the process a video encoder uses to generate an array of residual values or receiving an array of residual values. The chroma component may include any of the U and V or $C_r$ and $C_b$ chroma components described herein. The residual values may be generated by the video encoder 20 as part of a predictive coding technique described herein. It should be noted, that when an N/2 by N array of residual values for a chroma component corresponds to a N by N array of residual values for a luma component, the arrays may be associated with a CU of video data formatted according to the 4:2:2 format of video data as described above. Video encoder 20 partitions the N/2 by N array of residual values for the chroma component into two N/2 by N/2 sub-arrays of chroma residual values (1306). Video encoder 20 generates transform coefficients for the chroma component by performing a transform on each of the sub-arrays of chroma residual values (1308). It should be noted, as described above, that performing transforms on each of the two N/2 by N/2 sub-arrays may reduce the subjective appearance of blockiness when compared to performing a transform on an N/2 by N array. Video encoder 20 outputs transform coefficients (1310). In one example, video encoder 20 may output the transform coefficients to a video decoder as part of an encoded bitstream. It should be noted that in other examples, outputting of the transform coefficients may include outputting the transform coefficient to an entropy encoder. An entropy coder may then output entropy encoded transform coefficients to a video decoder as part of an encoded bitstream. It should be noted that although the method illustrated in FIG. 13 describes generating transform coefficients for a single chroma component, video encoder 20 may also generate transform coefficients for the other components in a similar manner. That is video encoder 20 may obtain arrays and sub-arrays of residual values and performs transforms on the arrays for each of the luma and chroma components.

Figure 14:
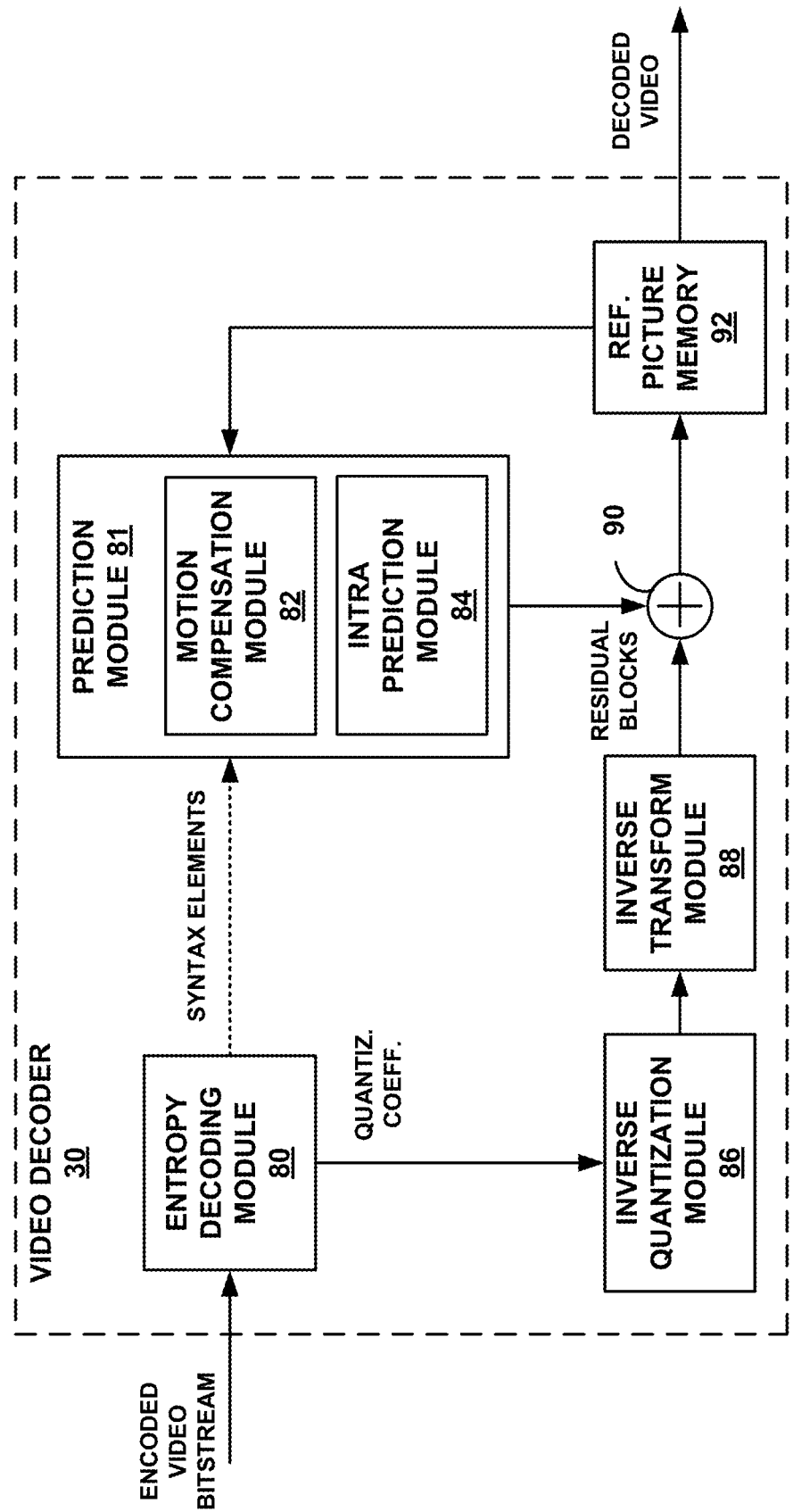
FIG. 14 is a block diagram illustrating an example video decoder that may implement the techniques described in this disclosure.

FIG. 14 is a block diagram illustrating an example video decoder 30 that may implement the techniques described in this disclosure. In the example of FIG. 14, video decoder 30 includes an entropy decoding module 80, prediction module 81, inverse quantization module 86, inverse transformation module 88, summer 90, and reference picture memory 92. Prediction module 81 includes motion compensation module 82 and intra prediction module 84. Video decoder 30 may, in some examples, perform a decoding pass generally reciprocal to the encoding pass described with respect to video encoder 20 from FIG. 12.

During the decoding process, video decoder 30 receives an encoded video bitstream that represents video blocks of an encoded video slice and associated syntax elements from video encoder 20. Entropy decoding module 80 of video decoder 30 entropy decodes the bitstream to generate quantized coefficients, motion vectors, and other syntax elements. Entropy decoding module 80 forwards the motion vectors and other syntax elements to prediction module 81. Video decoder 30 may receive the syntax elements at the video slice level and/or the video block level.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation module 82 of prediction module 81 produces predictive blocks for a video block of the current video slice based on the motion vectors and other syntax elements received from entropy decoding module 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation module 82 determines prediction information for a video block of the current video slice by parsing the motion vectors and other syntax elements, and uses the prediction information to produce the predictive blocks for the current video block being decoded. For example, motion compensation module 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation module 82 may also perform interpolation based on interpolation filters. Motion compensation module 82 may use interpolation filters as used by video encoder 20 during encoding of the video blocks to calculate interpolated values for sub-integer pixels of reference blocks. In this case, motion compensation module 82 may determine the interpolation filters used by video encoder 20 from the received syntax elements and use the interpolation filters to produce predictive blocks.

Inverse quantization module 86 inverse quantizes, i.e., de-quantizes, the quantized transform coefficients provided in the bitstream and decoded by entropy decoding module 80. The inverse quantization process may include use of a quantization parameter calculated by video encoder 20 for each video block in the video slice to determine a degree of quantization and, likewise, a degree of inverse quantization that should be applied.

Inverse transform module 88 receives transform coefficients and applies an inverse transform, e.g., an inverse DCT, an inverse integer transform, or a conceptually similar inverse transform process, to the transform coefficients in order to produce residual blocks in the pixel domain. In some examples, inverse transform module may receive transform coefficients that were generated by a video encoder based on the transform unit partitioning techniques described above with respect to FIGS. 8A-8B and FIG. 9. In one example, inverse transform module 88 may be configured to receive an N by N array of transform coefficients for a luma component of video data, receive a plurality of corresponding N/2 by N/2 sub-arrays of transform coefficients for a chroma component of video data, perform an inverse transform on each of the N/2 by N/2 sub-arrays of chroma transform coefficients to generate a plurality of N/2 by N/2 sub-arrays of residual sample values and combine each of the N/2 by N/2 sub-arrays of residual sample values to form an N/2 by N array of residual sample values for the chroma component.

After motion compensation module 82 or intra prediction module 84 generates the predictive block for the current video block based on the motion vectors and other syntax elements, video decoder 30 forms a decoded video block by summing the residual blocks from inverse transform module 88 with the corresponding predictive blocks generated by motion compensation module 82. Summer 90 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Video encoder 30 of FIG. 14 represents an example of a video decoder configured to receive an N by N array of transform coefficients for a luma component of video data, receive a plurality of corresponding N/2 by N/2 sub-arrays of transform coefficients for a chroma component of video data, perform an inverse transform on each of the N/2 by N/2 sub-arrays of chroma transform coefficients to generate a plurality of N/2 by N/2 sub-arrays of residual sample values and combine each of the N/2 by N/2 sub-arrays of residual sample values to form an N/2 by N array of residual sample values for the chroma component, in accordance with the techniques described in this disclosure.

Figure 15:
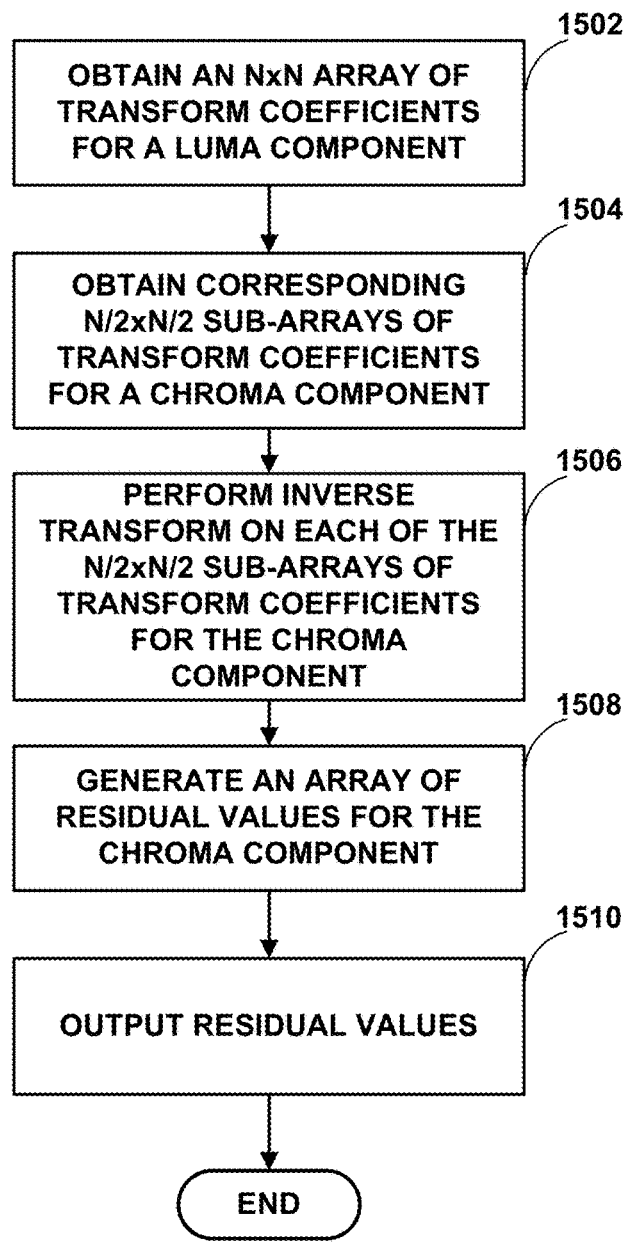
FIG. 15 is a flowchart illustrating an example method for generating residual values from transform coefficients.

FIG. 15 is a flowchart illustrating an example method for generating residual values for chroma blocks from transform coefficients. Although the process in FIG. 15 is described below with respect to video decoder 30, the process may be performed by any combination of video decoder 30, entropy decoding module 80 inverse quantization module 86, inverse transform module 88 and/or other components of video decoder 30.

As illustrated in FIG. 15, video decoder 30 obtains an N by N array of transform coefficients for a luma component of video data (1502). Video decoder 30 obtains a corresponding N/2 by N/2 array of transform coefficients for a chroma component of video data (1504). The chroma component may include any of the U and V or Cr and Cb chroma components described herein. The transform coefficients may be generated by a video encoder as part of a predictive coding technique described herein. It should be noted, that when an N/2 by N/2 sub-array of transform coefficients for a chroma component corresponds to an N by N array of coefficients for a luma component, the arrays may be associated with CUs of video data formatted according to the 4:2:2 format of video data as described above. Video decoder 30 performs an inverse transform on each of the N/2 by N/2 sub-arrays of transform coefficients for the chroma component (1506). Video decoder 30 generates array of residual values for the chroma component by combining the resulting residual values from each of the sub-arrays of chroma transform coefficients (1508). Video decoder 30 outputs residuals values (1510). In one example, video decoder 30 may output the residual values as a part of a video reconstruction process.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   obtaining a plurality of sub-arrays of transform coefficients for a luma component of a block of the video data;
   obtaining, in accordance with a 4:2:2 sample format, a plurality of smaller sub-arrays of transform coefficients for a chroma component of the block of video data that corresponds to the luma component, such that each of the plurality of smaller sub-arrays for the chroma component has a same aspect ratio as each of the sub-arrays for the luma component, and such that each of the plurality of smaller sub-arrays for the chroma component has a smaller dimensionality than a dimensionality of each of the plurality of sub-arrays for the luma component;
   performing an inverse transform on each of the plurality of sub-arrays of transform coefficients for the luma component to generate a plurality of residual sample values for the luma component;
   performing the inverse transform on each of the plurality of smaller sub-arrays of transform coefficients for the chroma component to generate a plurality of residual sample values for the chroma component;
   combining the plurality of residual sample values for the luma component to obtain an N by N array of residual sample values for the luma component of the block of the video data;
   combining the plurality of residual sample values for the chroma component to form an N/2 by N array of residual sample values for the chroma component, the N/2 by N array of residual sample values for the chroma component having a different aspect ratio from the N by N array of residual sample values for the luma component; and
   reconstructing the block of the video data based on the N by N array of residual samples for the luma component and the N/2 by N array of residual samples for the chroma component that has the different aspect ratio from the N by N array of residual samples for the luma component.

2. The method of claim 1,
   wherein each sub-array included in the plurality of sub-arrays of transform coefficients for the luma component comprises a respective N/2 by N/2 sub-array of the transform coefficients for the luma component of the block of the video data, and
   wherein each of the smaller sub-arrays of transform coefficients for the chroma component comprises a respective N/4 by N/4 array of transform coefficients for the chroma component.

3. The method of claim 2, N equaling 16 and the plurality of N/2 by N/2 sub-arrays of transform coefficients for the luma component of the block of the video data including four sub-arrays and the plurality of corresponding N/4 by N/4 sub-arrays of transform coefficients of the chroma component including eight sub-arrays.

4. The method of claim 1,
   the obtaining of the N by N array of transform coefficients for the luma component of the block of the video data comprising obtaining four N by N/4 sub-arrays of transform coefficients for the luma component of the block of the video data, and
   the obtaining of the plurality of the smaller sub-arrays of the transform coefficients for the chroma component of the block of the video data comprising obtaining eight corresponding N/2 by N/8 sub-arrays of the transform coefficients for the chroma component of the block of the video data.

5. The method of claim 4, N equaling 32.

6. A video decoding device comprising:
   a memory configured to store video data; and
   one or more processors in communication with the memory, the one or more processors being configured to:

obtain a plurality of sub-arrays of transform coefficients for a luma component of a block of the stored video data;

obtain, in accordance with a 4:2:2 sample format, a plurality of smaller sub-arrays of transform coefficients for a chroma component of the block of the stored video data that corresponds to the luma component, such that each of the plurality of smaller sub-arrays for the chroma component has a same aspect ratio as each of the sub-arrays for the luma component, and such that each of the plurality of smaller sub-arrays has a smaller dimensionality than a dimensionality of each of the plurality of sub-arrays for the luma component;

perform an inverse transform on each of the plurality of sub-arrays of transform coefficients for the luma component to generate a plurality of residual sample values for the luma component;

combine the plurality of residual sample values for the luma component to obtain an N by N array of residual sample values for the luma component of the block of the stored video data;

combine the plurality of residual sample values for the chroma component of the block of the video data to form an N/2 by N array of residual sample values for the chroma component, the N/2 by N array of residual sample values for the chroma component of the block having a different aspect ratio from the N by N array of residual sample values for the luma component of the block of the video data; and reconstruct the block of the video data based on the N by N array of residual samples for the luma component and the N/2 by N array of residual samples for the chroma component that has the different aspect ratio from the N by N array of residual samples for the luma component.

7. The video decoding device of claim 6, wherein each sub-array included in the plurality of sub-arrays of transform coefficients for the luma component comprises a respective N/2 by N/2 sub-array of the transform coefficients for the luma component of the block of the stored video data, and wherein each of the smaller sub-arrays of transform coefficients for the chroma component of the block of the stored video data comprises a respective N/4 by N/4 array of transform coefficients for the chroma component of the block of the stored video data.

8. The video decoding device of claim 7, N equaling 16 and the plurality of N/2 by N/2 sub-arrays of transform coefficients for the luma component of the block of the stored video data including four sub-arrays and the plurality of corresponding N/4 by N/4 sub-arrays of transform coefficients of the chroma component of the block of the stored video data includes eight sub-arrays.

9. The video decoding device of claim 6, wherein, to obtain the plurality of sub-arrays of transform coefficients for the luma component, the one or more processors are configured to obtain four N by N/4 sub-arrays of transform coefficients for the luma component of the block of the stored video data, and;

wherein, to obtain the plurality of the plurality of smaller sub-arrays of the transform coefficients for the chroma component of the block of the stored video data, the one or more processors are configured to obtain eight corresponding N/2 by N/8 sub-arrays of transform coefficients for the chroma component of the block of the stored video data.

10. The video decoding device of claim 9, wherein N equals 32.

11. A method for encoding video data comprising:

obtaining an N by N array of residual values for a luma component of a block of the video data;

obtaining an N/2 by N array of residual values for a chroma component of the block of the video data that corresponds to the luma block of the video data, the N/2 by N array of residual sample values for the chroma component having a different aspect ratio from the N by N array of residual sample values for the luma component of the block of the video data;

partitioning, in accordance with a 4:2:2 sample format, the N/2 by N array of residual values for the chroma component into two N/2 by N/2 sub-arrays of chroma residual values;

partitioning, in accordance with the 4:2:2 sample format, the N by N array of residual values for the luma component into a plurality of sub-arrays of luma residual values;

further partitioning each of the two N/2 by N/2 sub-arrays of the chroma residual values into a plurality of smaller sub-arrays such that the smaller sub-arrays of chroma residual values have the same aspect ratios as the corresponding sub-arrays of luma residual values; and performing a transform on each of the plurality of smaller sub-arrays of the chroma residual values to generate transform coefficients for the chroma component of the block of the video data.

12. The method of claim 11, further comprising:

partitioning the N by N array of residual values for the luma component into four sub-arrays of luma residual values; and further partitioning each of the two N/2 by N/2 sub-arrays of chroma residual values into four sub-arrays of chroma residual values based at least in part on the partitioning applied to the N by N array of residual values for the luma component.

13. The method of claim 12, the partitioning of the N by N array of residual values for the luma component into the four sub-arrays of the residual values for the luma component resulting in four 8 by 8 sub-arrays of luma residual values and the further partitioning of each of the two N/2 by N/2 sub-arrays of chroma residual values into four sub-arrays of chroma residual values resulting in eight 4 by 4 sub-arrays of chroma residual values.

14. The method of claim 12, the partitioning of the N by N array of residual values for the luma component into four sub-arrays of luma residual values resulting in four sub-arrays of luma residual values with aspect ratios of 4 to 1 and the further partitioning of each of the two N/2 by N/2 sub-arrays of chroma residual values into four sub-arrays of chroma residual values based at least in part on the partitioning applied to the N by N array of residual values for the luma component resulting in eight sub-arrays of chroma residual values with aspect ratios of 4 to 1.

15. The method of claim 11, the partitioning of the N/2 by N array of residual values for the chroma component into two N/2 by N/2 sub-arrays of chroma residual values including determining not to partition the N/2 by N array of residual values into two N/2 by N/2 sub-arrays of chroma residual values, if the two N/2 by N/2 sub-arrays are below a minimum transform unit size.

16. The method of encoding video data of claim 11, the method further comprising:

determining whether a first transform unit associated with the chroma component includes at least one nonzero transform coefficient;

determining whether a second transform unit associated with the chroma component includes at least one non-zero transform coefficient; and generating a joint coded block flag for the first transform unit and the second transform unit, the joint coded block flag indicating whether either of the first transform unit or the second transform unit includes at least one nonzero transform coefficient.

17. The method of claim 16, further comprising, when the joint coded block flag indicates that either of the first transform unit or the second transform unit includes at least one nonzero transform coefficient, generating a coded block flag that indicates whether the first transform unit includes at least one nonzero coefficient.

18. The method of claim 17, further comprising when the coded block flag indicates that the first transform unit includes at least one nonzero coefficient, generating a coded block flag for the second transform unit that indicates whether the second transform unit includes at least one nonzero transform coefficient.

19. A video encoding device comprising:
a memory configured to store video data; and
one or more processors in communication with the memory, the one or more processors being configured to:
  obtain an N by N array of residual values for a luma component of a block of the stored video data;
  obtain an N/2 by N array of residual values for a chroma component of the stored video data that corresponds to the luma block of the stored video data, the N/2 by N array of residual sample values for the chroma component having a different aspect ratio from the N by N array of residual sample values for the luma component of the block of the video data;
  partition, in accordance with a 4:2:2 sample format, the N/2 by N array of residual values for the chroma component into two N/2 by N/2 sub-arrays of chroma residual values;
  partition, in accordance with the 4:2:2 sample format, the N by N array of residual values for the luma component of the block of the stored video data into a plurality of sub-arrays of luma residual values;
  further partition each of the two N/2 by N/2 sub-arrays of the chroma residual values into a plurality of smaller sub-arrays such that the smaller sub-arrays of chroma residual values have the same aspect ratios as the corresponding sub-arrays of luma residual values; and
  perform a transform on each of the plurality of smaller sub-arrays of the chroma residual values to generate transform coefficients for the chroma component of the block of the stored video data.

20. The device of claim 19, the one or more processors being further configured to partition the N by N array of residual values for the luma component into four sub-arrays of luma residual values and further partition each of the two N/2 by N/2 sub-arrays of chroma residual values into four sub-arrays of chroma residual values based at least in part on the partitioning applied to the N by N array of residual values for the luma component.

21. The device of claim 20, the one or more processors being configured to partition the N by N array of residual values for the luma component into four sub-arrays of luma residual values so as to result in four 8 by 8 sub-arrays of luma residual values and the one or more processors being configured to further partition each of the two N/2 by N/2 sub-arrays of chroma residual values into four sub-arrays of chroma residual values so as to result in eight 4 by 4 sub-arrays of chroma residual values.

22. The device of claim 20, the one or more processors being configured to partition the N by N array of residual values for the luma component into four sub-arrays of luma residual values so as to result in four sub-arrays of luma residual values with aspect ratios of 4 to 1 and the one or more processors being configured to further partition each of the two N/2 by N/2 sub-arrays of chroma residual values into four sub-arrays of chroma residual values based at least in part on the partitioning applied to the N by N array of residual values for the luma component so as to result in eight sub-arrays of chroma residual values with aspect ratios of 4 to 1.

23. The device of claim 19, the one or more processors being configured to partition the N/2 by N array of residual values for the chroma component into two N/2 by N/2 sub-arrays of chroma residual values such that, to partition the N/2 by N array, the one or more processors are configured to determine not to partition the N/2 by N array of residual values into two N/2 by N/2 sub-arrays of chroma residual values, if the two N/2 by N/2 sub-arrays are below a minimum transform unit size.

24. A non-transitory computer-readable storage medium comprising instructions stored thereon that, when executed, cause one or more processors to:
  obtain an N by N array of residual values for a luma component of a block of video data;
  obtain an N/2 by N array of residual values for a chroma component of the block of the video data that corresponds to the luma block of the video data, the N/2 by N array of residual sample values for the chroma component having a different aspect ratio from the N by N array of residual sample values for the luma component of the block of the video data;
  partition, in accordance with a 4:2:2 sample format, the N/2 by N array of residual values for the chroma component into two N/2 by N/2 sub-arrays of chroma residual values;
  partition, in accordance with the 4:2:2 sample format, the N by N array of residual values for the luma component into a plurality of sub-arrays of luma residual values;
  further partition each of the two N/2 by N/2 sub-arrays of the chroma residual values into a plurality of smaller sub-arrays such that the smaller sub-arrays of chroma residual values have the same aspect ratios as the corresponding sub-arrays of luma residual values; and
  perform a transform on each of the sub-arrays of chroma residual values to generate transform coefficients for the chroma component.

25. The non-transitory computer-readable storage medium of claim 24, further comprising instructions that, when executed, cause the one or more processors to partition the N by N array of residual values for the luma component into four sub-arrays of luma residual values and further partition each of the two N/2 by N/2 sub-arrays of chroma residual values into four sub-arrays of chroma residual values based at least in part on the partitioning applied to the N by N array of residual values for the luma component.

26. The non-transitory computer-readable storage medium of claim 25, the instructions that cause the one or more processors to partition the N by N array of residual values for the luma component into four sub-arrays of luma residual values, when executed, resulting in four 8 by 8 sub-arrays of luma residual values and the instructions that cause the one or more processors to further partition each of the two N/2 by N/2 sub-arrays of chroma residual values into four sub-arrays of chroma residual values, when executed, resulting in eight 4 by 4 sub-arrays of chroma residual values.

27. The non-transitory computer-readable storage medium of claim 25, the instructions that cause the one or more processors to partition the N by N array of residual values for the luma component into four sub-arrays of luma residual values, when executed, resulting in four sub-arrays of luma residual values with aspect ratios of 4 to 1 and the instructions that cause the one or more processors to further partition each of the two N/2 by N/2 sub-arrays of chroma residual values into four sub-arrays of chroma residual values based at least in part on the partitioning applied to the N by N array of residual values for the luma component, when executed, resulting in eight sub-arrays of chroma residual values with aspect ratios of 4 to 1.

28. The non-transitory computer-readable storage medium of claim 24, the instructions that cause the one or more processors to partition the N/2 by N array of residual values for the chroma component into the two N/2 by N/2 sub-arrays of chroma residual values, when executed, causing the one or more processors to determine not to partition the N/2 by N array of residual values into two N/2 by N/2 sub-arrays of chroma residual values, if the two N/2 by N/2 sub-arrays are below a minimum transform unit size.

29. A method of encoding video data, the method comprising:
  determining whether a first transform unit associated with a chroma component includes at least one nonzero transform coefficient;
  determining whether a second transform unit associated with the chroma component includes at least one nonzero transform coefficient; and
  generating a joint coded block flag for the first transform unit and the second transform unit, the joint coded block flag indicating whether either of the first transform unit or the second transform unit includes at least one nonzero transform coefficient.

30. The method of claim 29, further comprising, when the joint coded block flag indicates that either of the first transform unit or the second transform unit includes at least one nonzero transform coefficient, generating a coded block flag that indicates whether the first transform unit includes at least one nonzero coefficient.

31. The method of claim 30, further comprising when the coded block flag indicates that the first transform unit includes at least one nonzero coefficient, generating a coded block flag for the second transform unit that indicates whether the second transform unit includes at least one nonzero transform coefficient.

* * * * *